(12) United States Patent
Yamamoto

(10) Patent No.: US 7,710,605 B2
(45) Date of Patent: *May 4, 2010

(54) PRINT SYSTEM AND PRINTER

(75) Inventor: Toshitsugu Yamamoto, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 960 days.

This patent is subject to a terminal disclaimer.

(21) Appl. No.: 11/140,696

(22) Filed: May 31, 2005

(65) Prior Publication Data

US 2006/0066909 A1 Mar. 30, 2006

(30) Foreign Application Priority Data

Sep. 28, 2004 (JP) ............................. 2004-282051

(51) Int. Cl.
*G06K 15/00* (2006.01)
*H04N 1/405* (2006.01)
*G09G 5/02* (2006.01)

(52) U.S. Cl. .................... 358/3.13; 358/3.14; 358/3.16; 345/596

(58) Field of Classification Search ................ 358/3.13, 358/3.14, 3.16, 3.17, 3.18; 345/596
See application file for complete search history.

(56) References Cited

U.S. PATENT DOCUMENTS 5,729,625 A   3/1998  Miyake ....................... 382/169
6,157,749 A   12/2000 Miyake ....................... 382/300
6,185,006 B1*  2/2001 Yoshida ....................... 358/1.9
2005/0063015 A1*  3/2005 Kakutani ..................... 358/3.12
2005/0123206 A1*  6/2005 Sakai et al. .................. 382/238

FOREIGN PATENT DOCUMENTS

| JP | 06-152986 | 5/1994 |
| JP | 09-275499 | 10/1997 |
| JP | 10-248012 | 9/1998 |

OTHER PUBLICATIONS

English Translation of Japanese Office Communication dated Jun. 2, 2009, for counterpart Japanese Patent Application No. 2004-282051.
Japanese Official Communication dated Jun. 2, 2009 for corresponding Japanese patent application No. 2004-282051.

* cited by examiner

*Primary Examiner*—Twyler L Haskins
*Assistant Examiner*—Fan Zhang
(74) *Attorney, Agent, or Firm*—Sidley Austin LLP

(57) ABSTRACT

A print system includes a computer and a printer. Image data having pseudo gradation with a dither pattern are printed by the printer. The computer divides the image data into predetermined areas, determines whether or not a dot arrangement pattern of image data in each of the areas matches a dither pattern that was used for generating the pseudo gradation, determines a representative value concerning a density of image data within the area if they match one another, and sends data related to the determined representative value to the printer. The printer obtains a representative value of each area from compressed data received from the computer and compares the obtained representative value with the dither pattern so as to reproduce a dot pattern.

8 Claims, 18 Drawing Sheets

TJK

| COORDINATE | DOT PATTERN | MINIMUM OF UPPER LIMIT | MAXIMUM OF LOWER LIMIT |
|---|---|---|---|
| (0, 0) | 0 | 255 | 175 |
| (0, 0) | 1 | 1 | 175 |
| (0, 0) | 2 | 1 | 175 |
| ⋮ | ⋮ | ⋮ | ⋮ |
| (0, 0) | 254 | 1 | 2 |
| (0, 0) | 255 | 1 | 0 |
| (0, 1) | 0 | 255 | 155 |
| ⋮ | ⋮ | ⋮ | ⋮ |
| (0, 1) | 255 | 1 | 0 |
| (0, 2) | 0 | 255 | 141 |
| ⋮ | ⋮ | ⋮ | ⋮ |
| (34, 17) | 255 | 0 | 0 |

| INPUT | OUTPUT CODE | NUMBER OF OUTPUT DIGITS |
|---|---|---|
| 0 | 0 | 1 |
| 1 | 10101 | 5 |
| 2 | 110010 | 6 |
| 3 | 1000100 | 7 |
| 4 | 1011011 | 7 |
| 5 | 10000111 | 8 |
| ... | ... | ... |
| 252 | 1010000 | 7 |
| 253 | 101111 | 6 |
| 254 | 100011 | 6 |
| 255 | 10010 | 5 |
| 256 | 11 | 2 |
| 257 | 10011 | 5 |
| 258 | 10100101 | 8 |

(b) FH2

| INPUT | OUTPUT CODE | NUMBER OF OUTPUT DIGITS |
|---|---|---|
| 0 | 0 | 1 |
| 1 | 1010 | 4 |
| 2 | . | . |
| . | . | . |
| 23 | | |
| 24 | | |
| 25 | | |

(c) FH3

| INPUT | OUTPUT CODE | NUMBER OF OUTPUT DIGITS |
|---|---|---|
| 0 | 0 | 1 |
| 1 | 1010 | 4 |
| 2 | . | . |
| . | . | . |
| 254 | | |
| 255 | | |

FIG. 17

CODE NUMBER = 26
ROOT = 24

DC2

| Root | CHILD 0 | CHILD 1 |
|------|---------|---------|
| 0    | -12     | -16     |
| 1    | -10     | -15     |
| 2    | -21     | -11     |
| 3    | -17     | -6      |
| 4    | -4      | -23     |
| 5    | -18     | -22     |
| 6    | 0       | -24     |
| 7    | -3      | -20     |
| 8    | -14     | -9      |
| 9    | 1       | -5      |
| 10   | -19     | -8      |
| 11   | 3       | 2       |
| 12   | -7      | -13     |
| 13   | 5       | 4       |
| 14   | -25     | 6       |
| 15   | 8       | 7       |
| 16   | 10      | 9       |
| 17   | 11      | -2      |
| 18   | 13      | 12      |
| 19   | 15      | 14      |
| 20   | 17      | 16      |
| 21   | 19      | 18      |
| 22   | 21      | 20      |
| 23   | -1      | 22      |
| 24   | 23      | -26     |

⑤ → 17
④ → 20
③ → 22
② → 23

「011011」
START FROM ROOT = 24 → 24

PRINT SYSTEM AND PRINTER

This application is based on Japanese Patent Application No. 2004-282051 filed on Sep. 28, 2004, the contents of which are hereby incorporated by reference.

BACKGROUND OF THE INVENTION

1. Field of the Invention

The present invention relates to a printer system and a printer in which image data having pseudo gradation generated by using a dither pattern are compressed by a computer and transmitted so that a printer can receive and expand the compressed data for printing out.

2. Description of the Prior Art

In general, there is a print system that includes a computer and printers. For such print systems, there is a system in which image processing such as pseudo gradation for image data to be printed is performed on the computer side, and a printer side receives the image data from the computer and outputs the image data without a special process for printing on a sheet of paper.

Conventionally, there is a printer that is used for this system, which is called a raster printer. The raster printer can be realized at low cost by using a small scale of hardware because a special image processing is not performed on the printer side. However, it has a disadvantage that data quantity to be transmitted becomes large because it is necessary to transmit image data that can be printed on a sheet of paper as it is to the printer. In addition, if the image data includes character data, a resolution should be raised for a clear print of characters. As a result, the quantity of data to be transmitted to the printer becomes larger. Therefore, the transmission of image data from a computer to a printer requires a lot of time.

In order to solve this problem, it is necessary to compress the image data on the computer side. However, if a compression process is complicated, the compression process itself may require a lot of time, and the printer side may also require a lot of time for an expansion process so that a scale of hardware and its cost increase.

Therefore, a compression technique is desired in which the compression process is light, a small scale of hardware is sufficient for expanding data and a high compression rate can be realized in order to realize a print system in which an inexpensive printer can be used and that enables a high speed process as a whole.

In order to print image data of multi gradation by a printer, it is necessary to realize the pseudo gradation of the image data in many cases. Conventionally, a dithering method is known well as a method for realizing the pseudo gradation. The dithering method uses a dither pattern and compares each of threshold values of the dither pattern with a value of each pixel in the image data for producing binary values.

There is a compression method that notes a dither pattern as disclosed in Japanese unexamined patent publication No. 6-152986. According to this method, the binarized image data are divided into blocks having a predetermined size. A reference pattern that corresponds to the number of dots included in any image block is compared with the image block. If the image block is identical to the reference pattern, a code indicating the reference pattern is assigned. Otherwise, a result of the comparison is coded.

In addition, as a compression technique for the binarized image data, there is a JBIG format that is approved to be adopted by ITU (International Telecommunications Union)-T recommendation.

However, according to the former method described in Japanese unexamined patent publication No. 6-152986 mentioned above, data quantity to be sent increases by the quantity of codes of the reference pattern because the reference pattern is coded when the designated image block is identical to the reference pattern.

On the contrary, according to the latter method of JBIG, the compression process is relatively light so that a computer can perform the compression process at a high speed. However, a data compression ratio of the JBIG method is not so high as other method such as an LZS method or an LZW method. Especially, the data compression ratio has tendency to decrease if half tone data increases.

SUMMARY OF THE INVENTION

An object of the present invention is to realize a print system in which the computer side can compress image data at a high speed and at a high data compression ratio, while the printer side can expand the compressed data by a small scale of hardware at a high speed, and a printer for the system.

In the print system according to the present invention, a printer 13 prints image data D1 having pseudo gradation generated by using a dither pattern DP as shown in FIG. 24. A computer 11 obtains a representative value "a" about a density of image data D1 from the same by using the dither pattern DP. Data about this representative value "a" are coded and sent as compressed data D2 to the printer 13. The printer 13 extracts the representative value "a" from the compressed data D2 and reproduces a dot pattern by using the representative value "a" and the dither pattern DP so that the image data (a half tone image) D1 having the pseudo gradation are restored. Then, the image is printed out on a sheet of paper or the like.

Namely, the print system according to the present invention includes a computer and a printer. The print system is a system for printing image data having pseudo gradation with a dither pattern by the printer. The computer divides the image data into predetermined areas, determines whether or not a dot arrangement pattern of image data in each of the areas matches a dither pattern that was used for the pseudo gradation, calculates a representative value concerning a density of image data within the area if they match one another, and sends data related to the calculated representative value to the printer. The printer obtains a representative value of each area from data that are received from the computer and compares the obtained representative value with the dither pattern so as to reproduce a dot pattern.

Preferably, the computer calculates a value "a" as the representative value by comparing respectively a density value of each pixel of image data within the area with a density value of each pixel of the dither pattern and by calculating the value "a" that satisfies the condition $$J \geq a \geq K,$$

where "J" represents the minimum value of density values of pixels of the dither pattern corresponding to beaten dots within the area, while "K" represents the maximum value of density values of pixels of the dither pattern corresponding to unbeaten dots if dots are beaten in a predetermined pattern area when a density value of each pixel of the image data is small.

Note that if dots are beaten when a density value of each pixel of the image data is large, the representative value "a" may be calculated so as to satisfy the condition, where "J" represents the minimum value of density values of pixels of the dither pattern corresponding to unbeaten dots within the area, while "K" represents the maximum value of density values of pixels of the dither pattern corresponding to beaten dots. Thus, in the present invention, a gradation property, a density and a relationship between each of them and beaten or unbeaten dots can be variously combined for application.

In addition, the computer determines the representative value by comparing a density value of each pixel of image data within the area with a density value of each pixel of the dither pattern and by determining the number of beaten or unbeaten dots in the area when dots are beaten in a predetermined pattern area if a density value of each pixel of the image data is small.

In addition, the computer determines a differential of representative value between each area and other area, and the determined differential is coded so as to produce the data to be sent to the printer.

In addition, if the dot arrangement pattern of the image data in the area does not match at least a part of the dither pattern that was used for generating the pseudo gradation, the computer further divides the area into plural small areas, determines whether or not a dot arrangement pattern of image data in each of the small areas matches a part of the dither pattern, and determines the number of beaten or unbeaten dots in the area as a representative value in the small area when the patterns match one another.

In addition, if the dot arrangement pattern of the image data in the area or in the small area does not match the dither pattern that was used for generating the pseudo gradation, the computer encodes an arrangement of beaten or unbeaten dots in the area or in the small area so as to produce the data to be sent to the printer.

In addition, the dither pattern is provided to the computer and the printer, respectively.

The printer according to an aspect of the present invention stores a dither pattern that is the same as the dither pattern provided to the computer, and the printer reproduces the image data having pseudo gradation before compressed by comparing the representative value received from the computer with the dither pattern so as to generate a dot pattern and by expanding the generated dot pattern.

Preferably, the dot pattern is received from the computer and is stored in the printer.

According to the present invention, the computer side can compress image data at a high speed and high compression ratio, while the printer side can expand the data by a small scale of hardware at a high speed. Thus, an inexpensive printer can be used while the process of the total system can be performed in a short time.

BRIEF DESCRIPTION OF THE DRAWINGS

FIGS. 16(a)-16(c) show examples of a Huffman code table.

FIG. 17 shows an example of a decoding table.

DESCRIPTION OF THE PREFERRED EMBODIMENTS

Hereinafter, the present invention will be explained more in detail with reference to embodiments and drawings.

[Overall Structure of a System]

Figure 1:
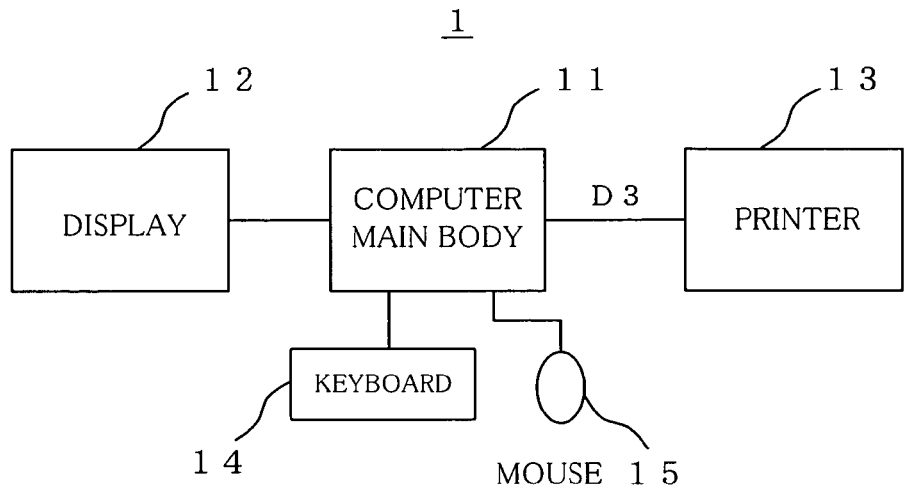
FIG. 1 shows an overall structure of a print system according to an embodiment of the present invention.

FIG. 1 shows an overall structure of a print system 1 according to an embodiment of the present invention.

In FIG. 1, the print system 1 includes a computer main body 11, a display 12, a printer 13, a keyboard 14 and a mouse 15.

The computer main body 11 produces pseudo gradation of image data (original image data) entered externally or generated internally by using a dither pattern in accordance with a dithering method. In this embodiment, a binarization process is used for the pseudo gradation so as to generate binarized image data D1. Then, the generated binarized image data D1 is encoded and compressed to be compressed data D2, which is transmitted to the printer 13. The printer 13 receives the compressed data D2, decodes and expands the compressed data D2, and produces the binarized image data (a half tone image) referring to the dither pattern that was used for the binarization process or the like for printing the image on a sheet of paper or the like.

In this embodiment, when performing the compression process, the binarized image data D1 are divided into a dither pattern information component and an image information component. Then, only the image information component is extracted, and a coding process by the Huffman method is performed to generate the compressed data D2. The dither pattern information component is not includes in the compressed data D2. Note that both the dither pattern information component and the image information component are compressed together in the conventional method.

More specifically, in the compression process of this embodiment includes dividing the binarized image data D1 into predetermined areas (low resolution areas TL that will be described later), determining whether or not an arrangement pattern of dots of image data in each area matches at least a part of the dither pattern that was used for the binarization, and calculating a representative value "a" concerning a density of image data in the area if they match one another. Then, differential information of the representative value "a" between neighboring areas is obtained, and the obtained differential information is coded by the Huffman method so as to obtain compressed data D2. The dither pattern that was used for the binarization is dither pattern information component, and the representative value "a" is the image information component.

Plural dither patterns are switched for use in accordance with a type of area such as a character area or an image area in the binarization process. Also in the compression process, the plural dither patterns are switched for determining whether or not each of them matches an arrangement pattern of dots of image data in each area.

If there is no dither pattern that matches the arrangement pattern of dots of image data in an area, the area is further divided into plural small areas (a medium resolution area TM that will be described later), so as to determine whether or not an arrangement pattern of dots of image data in each small area matches at least a part of the dither pattern. If they match one another, the number of dots beaten in the small area is regarded as the representative value. If they don't match one another again, the arrangement of dots in the area or the small area is coded so as to obtain the compressed data D2.

The computer main body 11 transmits the obtained compressed data D2 to the printer 13. In addition, the computer main body 11 transmits information about a dither pattern and a decoding table DC that is a table for expansion (decoding) by the Huffman method to the printer 13 in advance. Note that there are decoding tables DC1-DC3 as the decoding table DC corresponding to a low resolution area, a medium resolution area and a high resolution area. They will be described later in detail.

The printer 13 obtains the representative value "a" of each area from the compressed data D2 that were received from the computer main body 11, compares the obtained representative value "a" with the corresponding dither pattern so as to reproduce a dot pattern (an arrangement pattern of dots) that is identical to that of the original binarized image data D1. In this expansion process (decoding process), the decoding table DC is used for the expansion by Huffman method.

As the computer main body 11, a personal computer, a workstation or other type of computer can be used. As the printer 13, a raster printer, a GDI printer or other type of printer can be used.

[Compression Process]

Next, the compression process in the computer main body 11 will be described more in detail.

Figure 2:
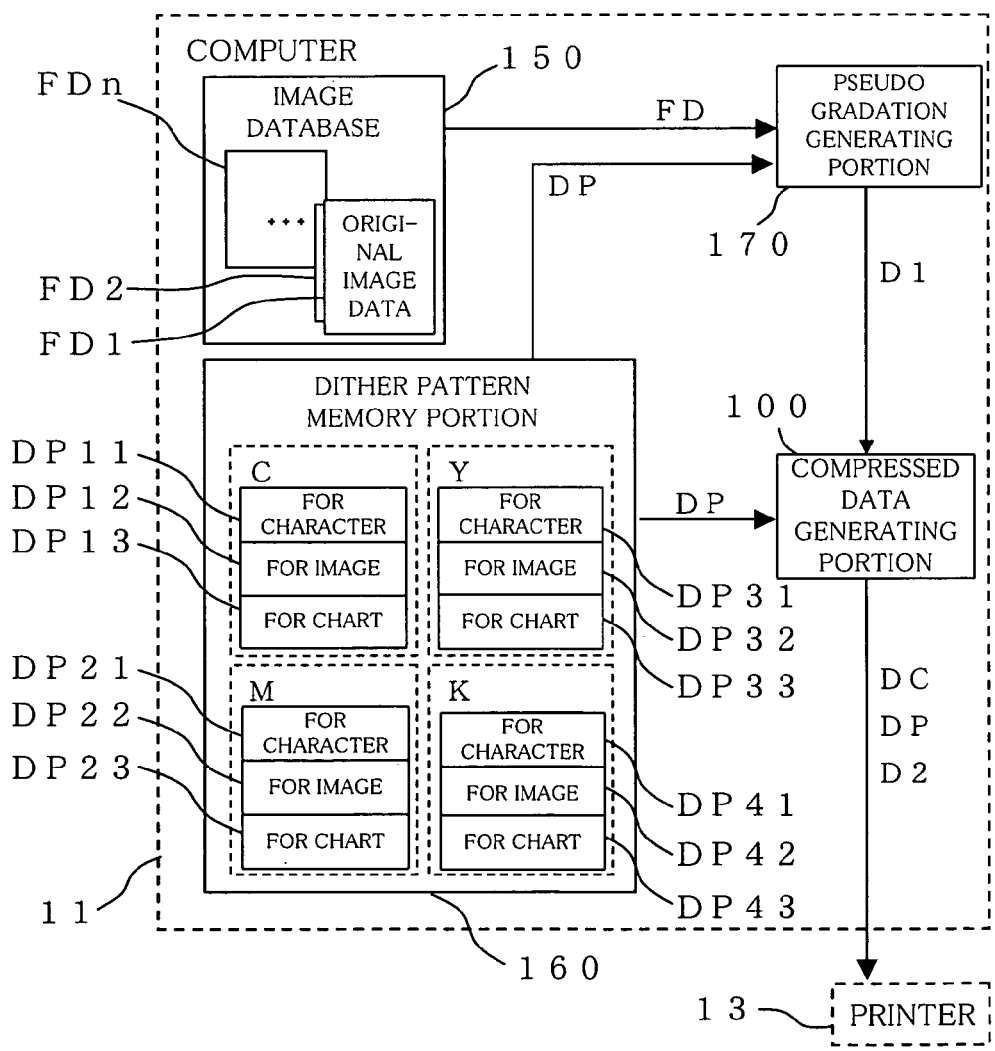
FIG. 2 is a block diagram showing a functional structure of a computer main body.
Figure 3:
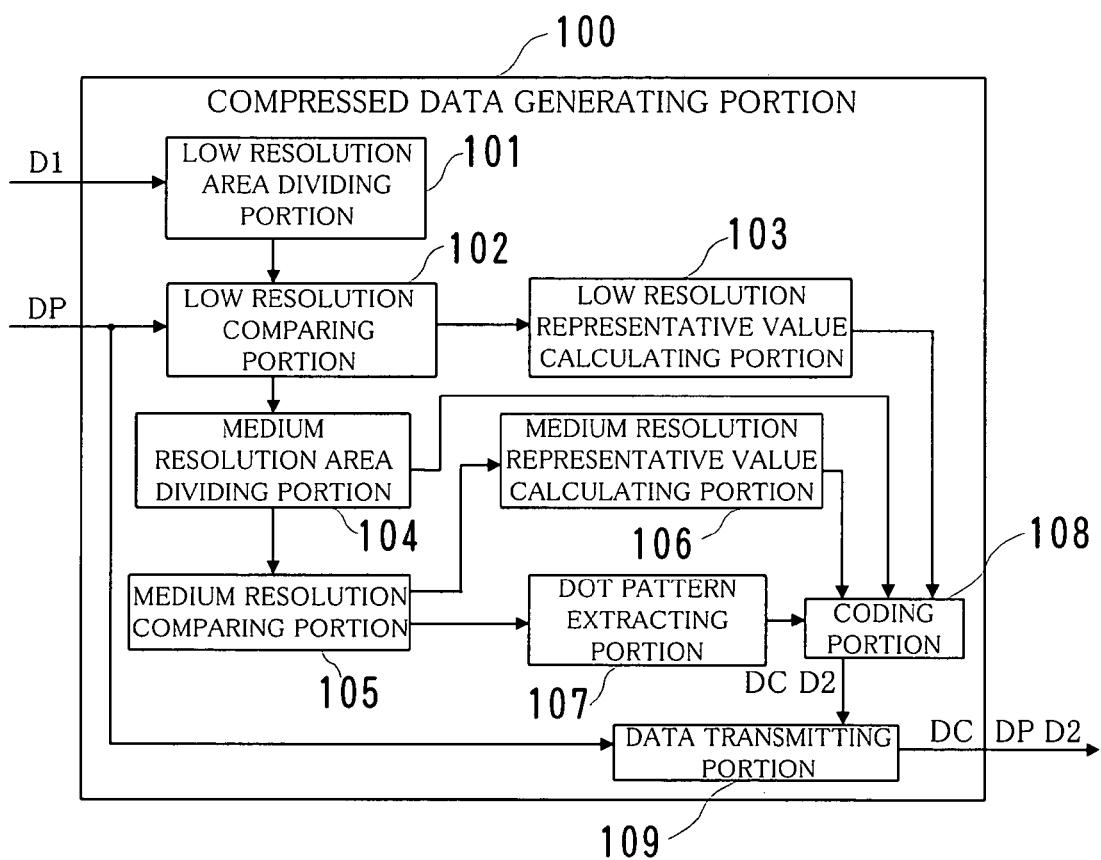
FIG. 3 is a block diagram showing a compressed data generating portion of the computer main body in functional manner.
Figure 4:
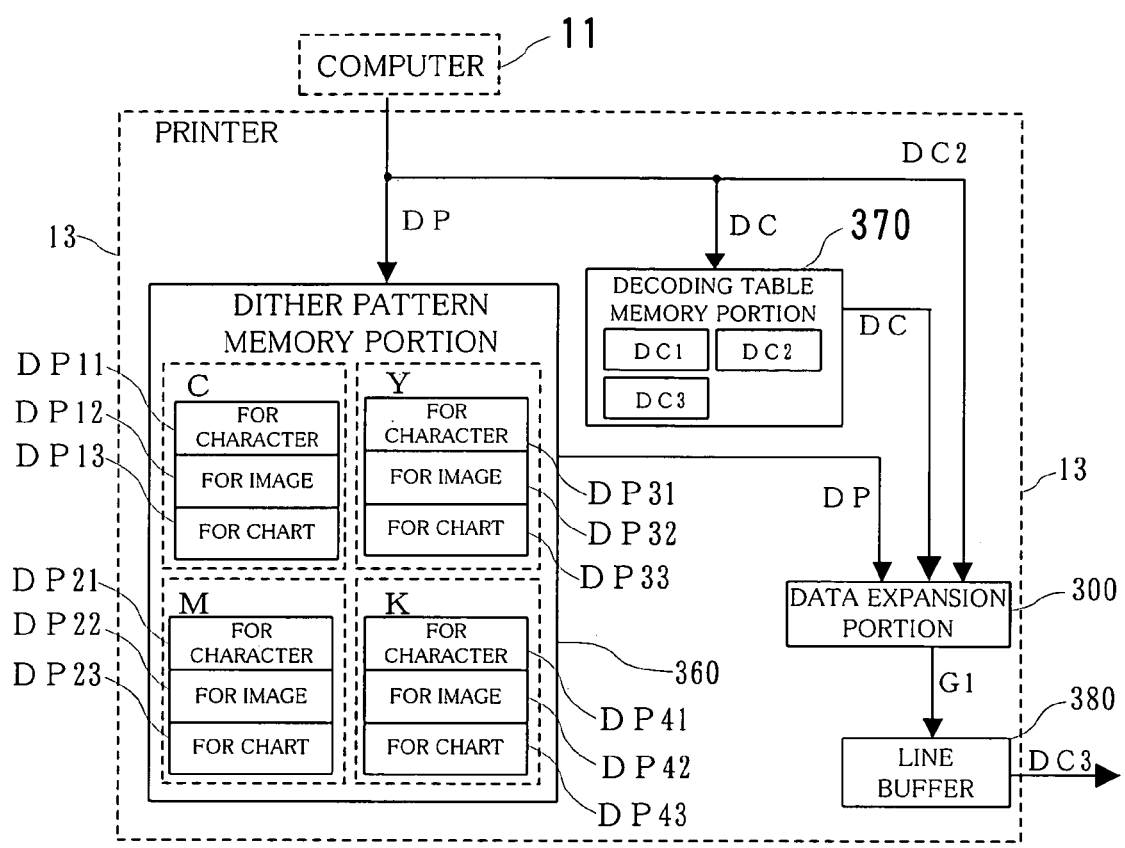
FIG. 4 is a block diagram showing a functional structure of a printer.
Figure 5:
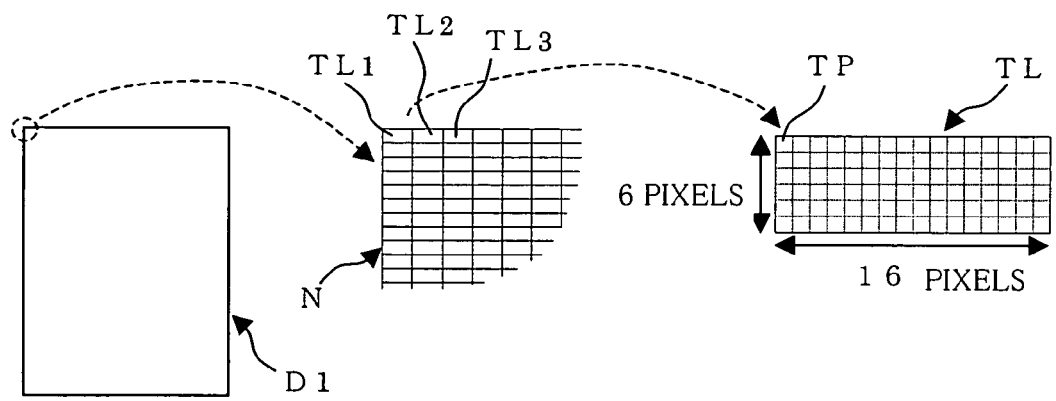
FIG. 5 is a diagram showing divided low resolution areas.
Figure 6:
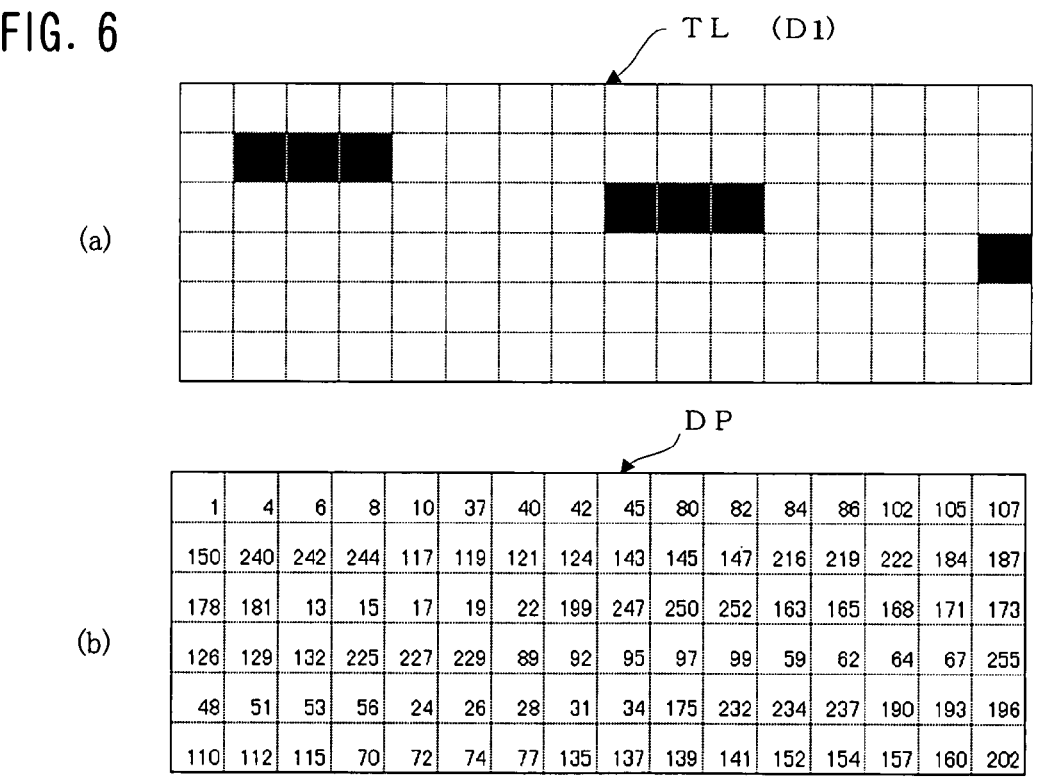
FIGS. 6(a) and 6(b) show examples of the low resolution area and a dither pattern.
Figures 7, 8:
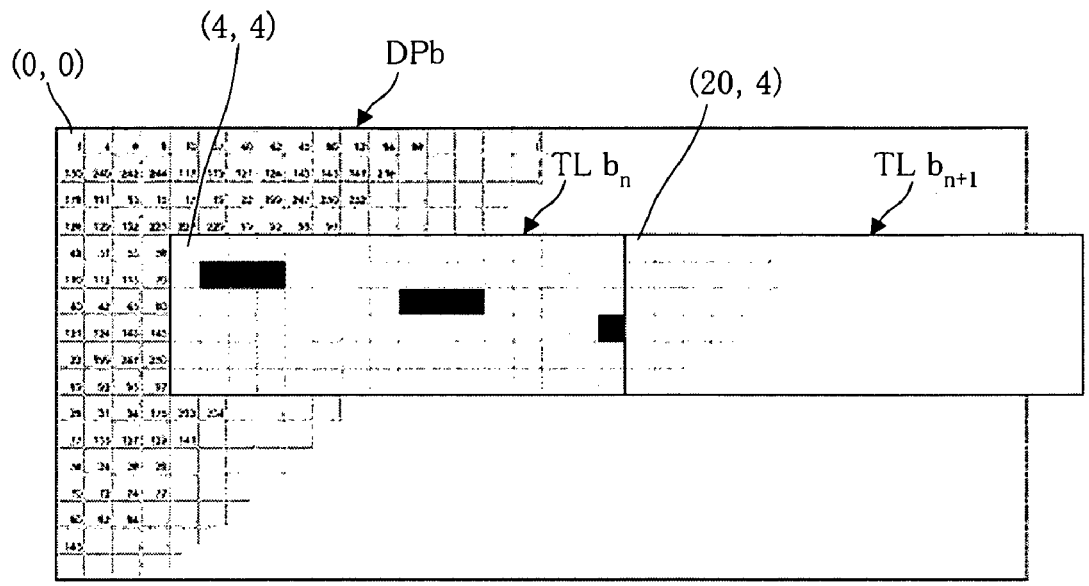
FIG. 7 shows an example of the low resolution area and the dither pattern having different sizes.
FIG. 8 shows an example of an upper and lower limit table.

FIG. 2 is a block diagram showing a functional structure of the computer main body 11, FIG. 3 is a block diagram showing a compressed data generating portion 100 of the computer main body 11 in functional manner, FIG. 4 is a block diagram showing a functional structure of the printer 13, FIG. 5 is a diagram showing divided low resolution areas TL, FIGS. 6(a) and 6(b) show examples of the low resolution area TL and a dither pattern DP, FIG. 7 shows an example of the low resolution area TL and the dither pattern DP having different sizes.

As shown in FIG. 2, the computer main body 11 includes an image database 150, a dither pattern memory portion 160, a pseudo gradation generating portion 170 and a compressed data generating portion 100.

The image database 150 stores a lot of image data (original image data) FD1, FD2, ... FDn having gradation properties. The whole or a part of the image data FD1-FDn may be referred to as "image data FD". Note that most of the image data FD are color images, in which one of image data FD includes color image data of C (cyan), M (magenta), Y (yellow) and K (black). The image data FD can be obtained by entering externally using a scanner, a digital camera or other devices, or by editing or generating internally.

The dither pattern memory portion 160 stores plural types of dither patterns DP11-DP13, DP21-DP23, DP31-DP33 and DP41-DP43. The whole or a part of them may be referred to as "dither pattern DP".

The dither pattern DP includes dither patterns DP11, DP21, DP31 and DP41 for a character area, dither patterns DP12, DP22, DP32 and DP42 for an image area and dither pattern DP13, DP23, DP33 and DP43 for a chart area, respectively for each color C, M, Y or K.

The pseudo gradation generating portion 170 performs the binarization process for image data FD stored in the image database 150 by using the dither pattern DP selected from the dither pattern memory portion 160 and sends the obtained binarized image data D1 to the compressed data generating portion 100. The binarized image data D1 also include color binarized image data of each color C, M, Y or K.

The compressed data generating portion 100 compresses the binarized image data D1 so as to generate the compressed data D2 and sends the generated compressed data D2, the dither pattern DP and the decoding table DC to the printer 13.

As shown in FIG. 3, the compressed data generating portion 100 includes a low resolution area dividing portion 101, a low resolution comparing portion 102, a low resolution representative value calculating portion 103, a medium resolution area dividing portion 104, a medium resolution comparing portion 105, a medium resolution representative value calculating portion 106, a dot pattern extracting portion 107, a coding portion 108 and a data transmitting portion 109.

[Process in Low Resolution Areas]

The low resolution area dividing portion 101 divides the binarized image data D1 received from the pseudo gradation generating portion 170 into a lot of small areas, i.e., low resolution areas TL. The low resolution area TL is a rectangular area including 96 (6×16) pixels TP, for example, as shown in FIG. 5. In the example shown in FIG. 5, the entire area of the binarized image data D1 is divided into low resolution areas TL1, TL2, TL3, ... TLn in order from the upper left area.

The low resolution comparing portion 102 compares a dot pattern of each low resolution area TL with the dither pattern DP so as to determine whether or not they match one another. The determination whether or not they match one another is performed as follows.

Namely, it is imagined there are uniform image data in which all the pixels have a certain density value (or a gradation value). If a dot pattern obtained by binarizing the imaginary image data with the dither pattern DP is identical to a dot pattern of the low resolution area TL, it is determined that the dot pattern of the low resolution area TL matches the dither pattern DP. The density value that is used for the determination can be any value. In other words, it is determined that they match one another if there is a density value that makes the dot patterns be identical to one another when a dot pattern is generated by using the dither pattern DP. Therefore, there is the case where such a density value is a specific single value or the case where such a density value can be plural values within a certain range. This density value is the representative value "a" itself mentioned above. The relationship will be described later, too.

The low resolution comparing portion 102 compares the dot pattern in the low resolution area TL with the dither pattern DP for the binarized image data D1 from the upper left to the right side and to the lower side one by one area. For example, the comparing process is performed for each area from the left end to the right end for the upper end unit lines. When the comparing process is finished for one unit line, the comparing process is continued for each area from the left end of the adjacent lower unit line to the right end. Thus, the comparing process is finished at the lower right end area.

As the dither pattern DP that is used for the comparing process, a dither pattern DP corresponding to each color of the binarized image data D1 is used. Then, the dither pattern DP for a character area is firstly used corresponding to each color. If the dither pattern DP of the character area does not match, the dither pattern DP for an image area is used next. If it also does not match, the dither pattern DP for a chart area is used. In this way, if the dither pattern DP does not match, it is switched in order. Information indicating that the dither pattern DP has been switched is used for coding as information that specifies the dither pattern DP that was used. If no dither pattern DP matches, the determination result of "not matched" is output.

The low resolution representative value calculating portion 103 calculates the representative value "a" if the determination result in the low resolution comparing portion 102 is "matched". The representative value "a" is calculated as follows.

[Calculation of the Representative Value "a"]

In the low resolution area TL shown in FIG. 6(*a*), the pixel filled with black is the pixel of a beaten dot. Here is considered image data FD in an area corresponding to the low resolution area TL among image data FD having a gradation property before the binarization process. Such image data FD are referred to as "image data FDL". Then, it is considered that a dot is beaten at the pixel when the density value of each pixel in the image data FDL is less than a threshold value of the corresponding pixel in the dither pattern DP shown in FIG. 6(*b*). Namely, it is supposed that the smaller the density value, the higher the density is.

In this case, if a dot is beaten at a certain pixel, it can be said that the density value of the pixel was less than a threshold value of the corresponding pixel in the dither pattern DP. This can be said in other words that the upper limit value of the density of the pixel was smaller than the threshold value of the corresponding pixel in the dither pattern DP by "1". On the contrary, if the dot is not beaten, it is regarded that the density value of the pixel is more than or equal to the threshold value of the corresponding pixel in the dither pattern DP. This can be said in other words that the lower limit value of the density of the pixel was the threshold value of the corresponding pixel in the dither pattern DP.

Therefore, in the low resolution area TL and the dither pattern DP, the upper limit value and the lower limit value of each pixel are summed up, so as to calculate the minimum value J of the upper limit values and the maximum value K of the lower limit values. If the relationship (1) as below is satisfied concerning the minimum value J of the upper limit values and the maximum value K of the lower limit values, the value "a" that satisfies the relationship (2) exists.

$$J \geq K \quad (1)$$

$$J \geq a \geq K \quad (2)$$

This value "a" is the representative value "a". In other words, if the relationship (1) is satisfied, the dot pattern in the low resolution area TL matches the dither pattern DP, and the representative value "a" exists. When the representative value "a" is determined, it is possible to restore to the dot pattern in the low resolution area TL from the dither pattern DP. Namely, only by calculating the only one representative value "a" in each area as the image information component, the binarized image data D1 in the area can be reproduced using the dither pattern DP that matches the low resolution area TL.

Therefore, by transmitting this representative value "a" to the printer 13, the printer 13 can reproduce the dot pattern in the binarized image data D1 by using the appropriate dither pattern DP that is the same when the binarized image data D1 was obtained.

If the image data FD has gradation of 256 levels for each color, the representative value "a" has quantity of information of 8 bits. In this embodiment, the low resolution area TL has quantity of information of 6×16=96 bits. As the information can be expressed by 8 bits, the quantity of information can be compressed to approximately one tenth. In addition, the representative values "a" are close to each other in neighboring low resolution areas TL in most image data FD. Namely, there is a tendency that a differential of the density is small in neighboring areas, so the difference of representative value "a" is small. Therefore, when a difference between the representative value "a" in a certain low resolution area TL and the representative value "a" in the low resolution area TL that was calculated just before, the difference becomes "0" in many cases, so that deviation of a statistical frequency of the difference becomes large. Namely, higher compression ratio by the Huffman method becomes possible by using the differential of the representative value "a" instead of the representative value "a" itself. Thus, it is possible to compress further to a fraction in the coding process.

Note that although the size of the divided low resolution area TL is identical to the size of the dither pattern DP in the example shown in FIG. 6, these sizes can be different from one another.

For example, as shown in FIG. 7, the size of the low resolution area TLb can be smaller than the size of the dither pattern DPb. In this case, plural low resolution areas $TLb_n$ and $TLb_{n+1}$ are compared with different portions in the dither pattern DPb. In this case, the position of coordinates of the dither pattern DPb that is applied to a first low resolution area TLb of the binarized image data D1 is determined first, and then the dither pattern DPb is shifted one by one to that the position of coordinates of the dither pattern DPb that is applied to each of the low resolution areas TLb is determined uniquely.

On the contrary to the example shown in FIG. 7, the size of the low resolution area TL can be larger than the size of the dither pattern DP.

As understood from the above description, the representative value "a" can be calculated by various methods. Next, one of the methods will be described in which a table that was generated in advance is referred to for calculating the representative value "a".

As described above, what are necessary for calculating the representative value "a" are the minimum value J of the upper limit value of each pixel value corresponding to a dot pattern of a certain area and the maximum value K of the lower limit value. These are determined by a position within the dither pattern DP and the dot pattern in the area when the dither pattern DP is given. A position within the dither pattern DP can be indicated by binary variables as coordinates of a first pixel in the area. The dot pattern can be indicated by an integer within the range of 0-255 for each one block, which is regarded to include 8 pixels and is digitized (see FIG. 14). In this case, an integer value is obtained only by interpreting the dot pattern of the 8 pixels as a numeric value as it is, so no conversion process is required. Therefore, it is sufficient if there is a table that describes the minimum value J of the upper limit value and the maximum value K of the lower limit value corresponding to 256 dot patterns of 0-255 for each pixel of the dither pattern DP. Namely, the table for converting data of the number of pixels of the dither pattern DP multiplied by 256 is sufficient for describing all. If there is such a table, a value described in the position (the minimum value J and the maximum value K) can be extracted easily and fast from the position coordinates in the dither pattern DP and the integer value of the dot pattern. In this embodiment, such a table is prepared as the upper and lower limit table TJK.

FIG. 8 shows an example of an upper and lower limit table TJK.

The upper and lower limit table TJK shown in FIG. 8 indicates a relationship among the coordinates and the dot pattern in the dither pattern DP, the minimum value J of the upper limit value, and the maximum value K of the lower limit value for a certain dither pattern DP.

Therefore, the low resolution area TL described above is divided into 12 blocks each of which includes 8 pixels, and the minimum value J and the maximum value K are determined for each block. For example, if coordinates of a certain block in the dither pattern DP is (0,2) and the integer value of the dot pattern is "0", it is found from the upper and lower limit table TJK that the minimum value J is "255" and the maximum value K is "141".

In accordance with the minimum values J and the maximum values K of 12 blocks obtained by the above process, the minimum value J and the maximum value K of the entire low resolution area TL are determined. Namely, the minimum value J in the low resolution area TL is the minimum value among 12 minimum values J, while the maximum value K in the low resolution area TL is the maximum value among 12 maximum values K.

In this way, the process for calculating the representative value "a" can be realized by reading data from the upper and lower limit table TJK that is approximately 2 megabytes at most by using the upper and lower limit table TJK. As reading data from the table can be performed at a high speed, the representative value "a" can be determined at a high speed. Furthermore, as this process is a large load in the entire compression process, the total process time can be shortened largely.

Note that the upper and lower limit table TJK can be used for determining whether or not the block of 8 pixels matches the dither pattern DP.

As described above, the representative value "a" can be obtained from the obtained minimum value J and maximum value K. The representative value "a" can be a specific value or can be plural values distributing in a certain range. However, in order to reproduce the dot pattern of the binarized image data D1 in the printer 13, only one value of the representative value "a" is sufficient. There is a method for extracting one specific value from obtained representative values "a" distributing in a certain range. The method will be described below.

Figure 9:
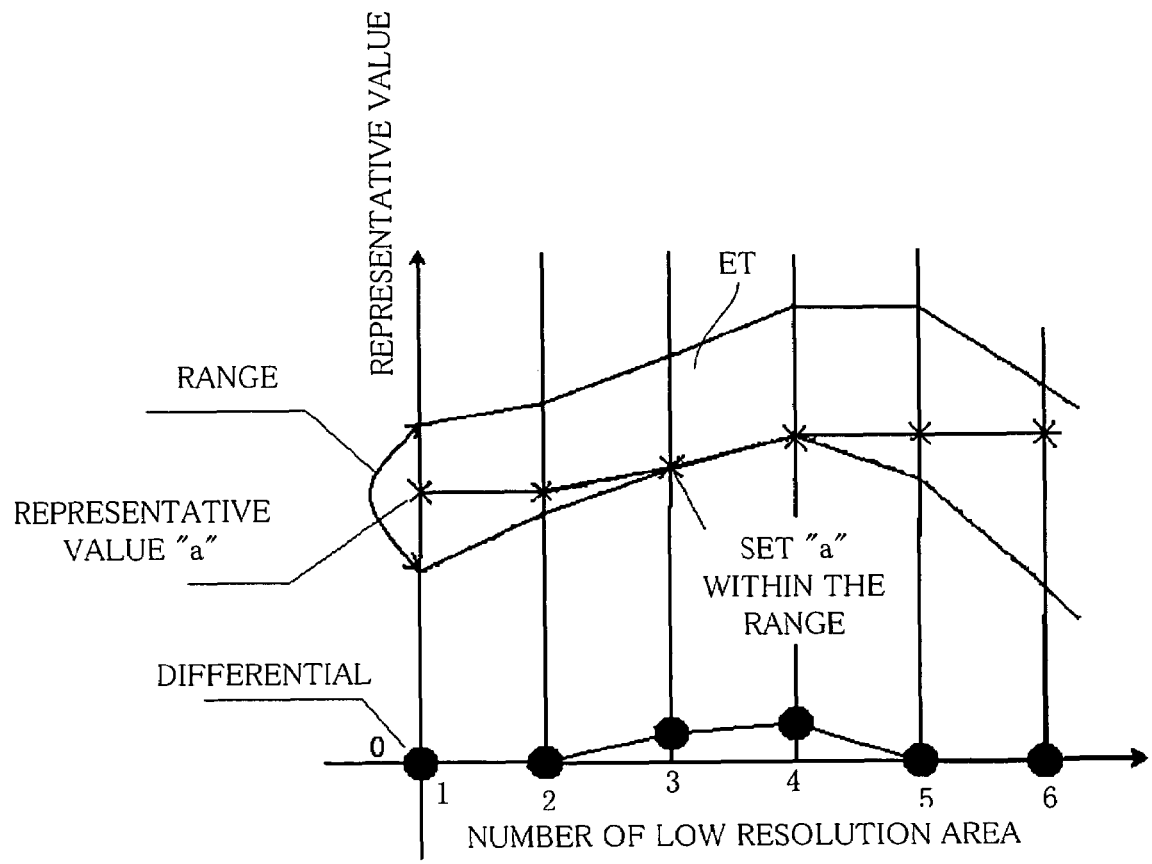
FIG. 9 shows an example of transition of a representative value about plural low resolution areas.

FIG. 9 shows an example of transition of a representative value about plural low resolution areas TL.

In FIG. 9, the horizontal axis indicates a number of the low resolution area TL, while the vertical axis indicates a representative value. As shown in FIG. 9, the representative value has a certain range ET. Therefore, the representative value "a" is determined so that the change of representative value "a" becomes as small as possible, i.e., that the differential of the representative value "a" between neighboring low resolution areas TL becomes close to "0".

Namely, a representative value "a" of the fist low resolution area TL located at the left end position in FIG. 9 is determined to be a median value, and a representative value "a" of the second low resolution area TL located at the right side of the fist low resolution area TL is set to the same vale as the first representative value "a". A representative value "a" of the third low resolution area TL is set to an appropriate value within the range because the same value as the second representative value "a" for the third value is outside the range. A representative value "a" of the fourth low resolution area TL is also set to an appropriate value within the range similarly to the third representative value. A fifth representative value "a" is set to the same value as the fourth representative value "a". Differentials of the representative values "a" determined by the above process are shown in the lower part of FIG. 9. When "0" increases as the differential of the representative value "a", the deviation of frequency increases. Thus, data with a high compression ratio can be obtained in coding by the Huffman method.

The representative value "a" can be a value within the range of 0-255, so the range of the differential is from −255 to +255 according to a simple subtracting process, which can be expressed by 9 bits as quantity of information. However, the differential is determined not by a simple subtracting process but by regarding that the representative value "a" is a recurring integer of 0-255 in this embodiment. Thus, all the differential values can be expressed by an integer of 0-255, which can be expressed by 8 bits as quantity of information that is a half of the necessary information quantity mentioned above.

Next, a method of determining the differential regarding that the representative is a recurring integer. In order to simplify the description, it will be described about recurring integers of 0-8.

Figure 10:
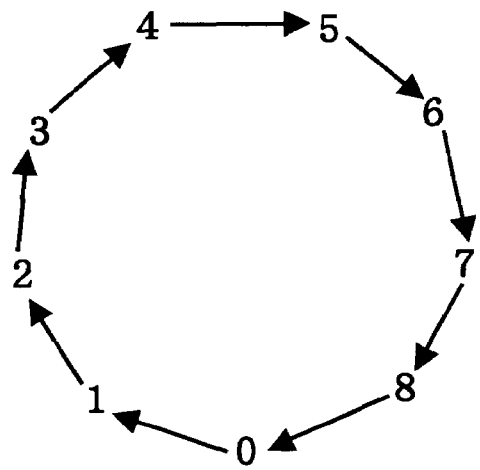
FIG. 10 shows an example of a recurring integer.

FIG. 10 shows an example of a recurring integer of 0-8.

In order to determine the differential C between a number A that is a reference and another number B in FIG. 10, the position of the number A in the recurring integer is moved counterclockwise by the position number corresponding to the number B. The number of the stop position is set as the differential C. For example, the differential between "5" and "3" is "2" that is obtained by moving from the position "5" counterclockwise by 3 in the recurring integer. In another example, the differential between "0" and "8" is "1" that is obtained by moving from the position "0" counterclockwise by 8 in the recurring integer. In still another example, the differential between "3" and "5" is "7" that is obtained by moving from the position "3" counterclockwise by 5 in the recurring integer. In this way, the differential can be obtained as an integer value within the range of 0-8.

In addition, a number A can be obtained by adding the differential C to a number B. In this case, the position indicated by the number B in the recurring integer is moved clockwise by the position number corresponding to the differential C, and the number of the stop position is set as the number A. In this way, complete expansion or restoration can be realized.

Figure 11:
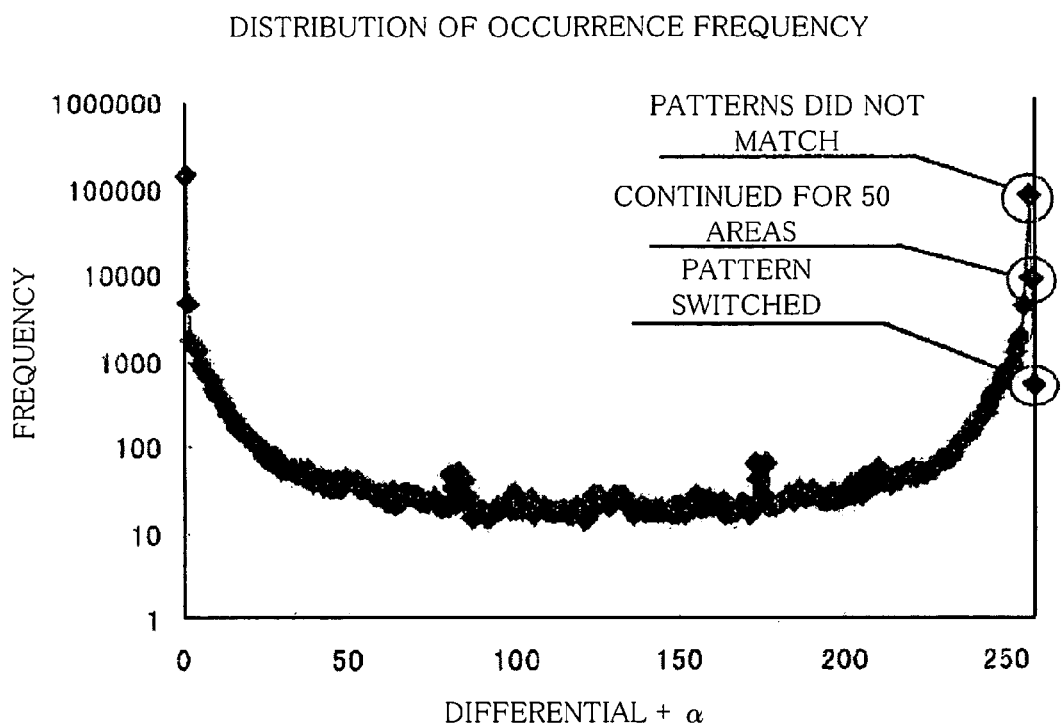
FIG. 11 is a graph showing a distribution of occurrence frequency of a differential of the representative value in an image.

FIG. 11 is a graph showing a distribution of occurrence frequency of a differential of the representative value in an image.

As shown in FIG. 11, the occurrence frequency is high in the differential ranges of approximately "0"-"20" and "230"-"255". Such a distribution is substantially the same regardless of a type of the image and has a very large deviation. Therefore, most images can be compressed largely by the Huffman method by using the differential.

Although it depends on the image, one low resolution area TL can be compressed to approximately 1-2 bits. In addition, a probability that a dot pattern of a low resolution area TL including 6×16 pixels matches the dither pattern DP is approximately 95% in most images. Namely, data of 96 bits originally can be expressed by 1-2 bits in approximately 95% of the entire area of the image, which means high compression ratio of a few tens can be realized at this stage.

Note that occurrence frequencies are shown for three values "256", "257" and "258" after 0-255 that are differentials of the representative values "a" in FIG. 11. Namely, when a predetermined state happens, the state is shown by the specific three values, which further reduces the quantity of information for realizing higher compression ratio.

For example, there is a state happening often where pixels having the same density continue for a long in an image. Therefore, as being described later, if the same density continues for 50 areas, i.e., if the differential value of "0" continues 50 times, it is indicated by an attribution code of "257". The attribution code of "256" indicates that a certain low resolution area TL did not match any of the dither patterns DP. The attribution code of "258" indicates that the dither pattern DP is switched, i.e., a certain low resolution area TL matched another dither pattern DP that was switched. If the dither pattern DP is switched twice, the attribution code of "258" is output twice.

As described above, the low resolution representative value calculating portion 103 determines representative values "a" in turn for the low resolution areas TL and determines differentials between neighboring areas. The data to be sent to the coding portion 108 are generated in accordance with the differential values and the attribution values.

For example, if the value "0" continues 50 times as differential values, the attribution value "257" is output to the coding portion 108. The differential value "0" is not output. If the differential value "0" did not continue 50 times, the value "0" is output plural times corresponding to the number of continuing times before that time, and after that a differential value except "0" is output. If the dither pattern DP is switched, the attribution code "258" is output once or plural times corresponding to the number of switching times. If the low resolution area TL did not match any of the dither patterns DP, the attribution code "256" is output. In this case, the low resolution area TL is processed by the medium resolution area dividing portion 104 as explained below.

[Process of Medium Resolution Area and High Resolution Area]

Figure 12:
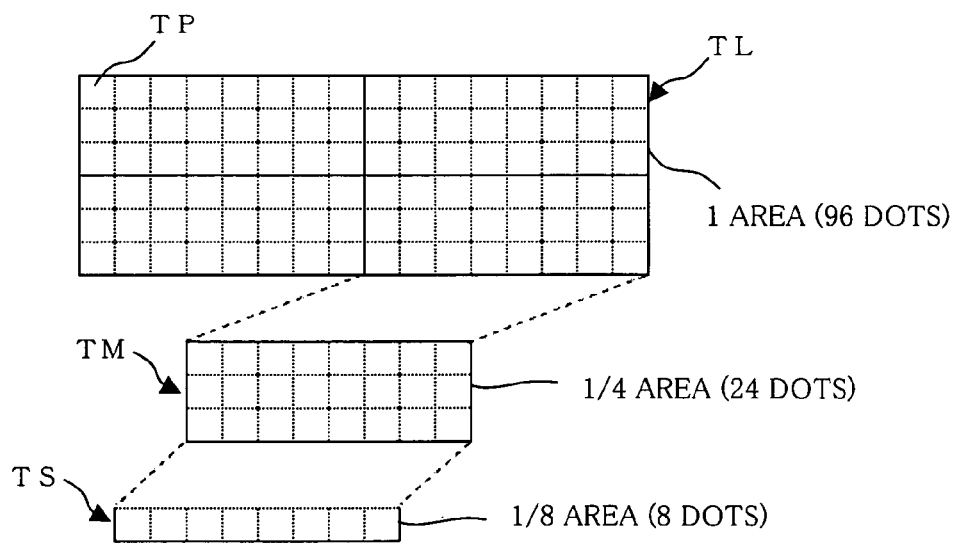
FIG. 12 shows a low resolution area and a medium resolution area.
Figure 13:
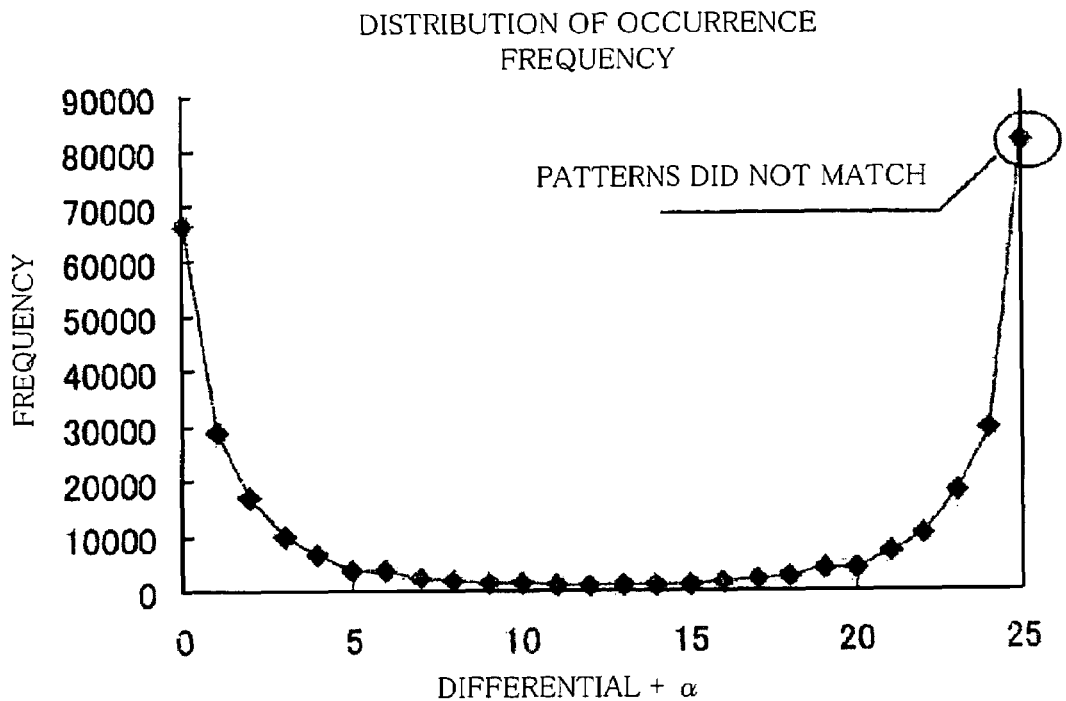
FIG. 13 is a graph showing a distribution of occurrence frequency of the differential of the number of dots in an image.
Figure 14:
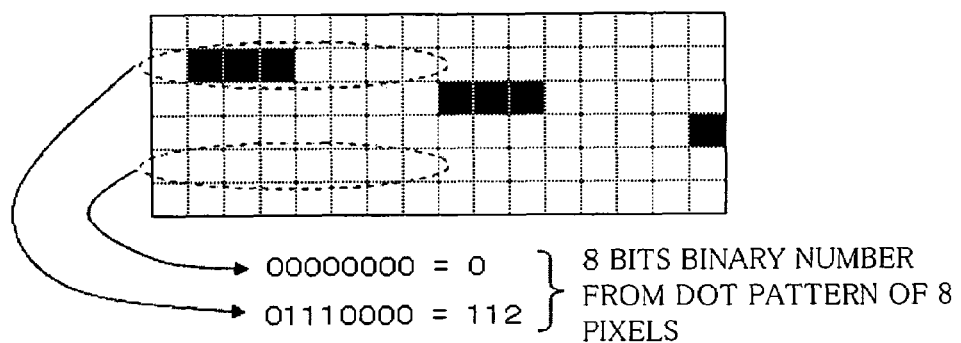
FIG. 14 shows digitization of a dot pattern.
Figure 15:
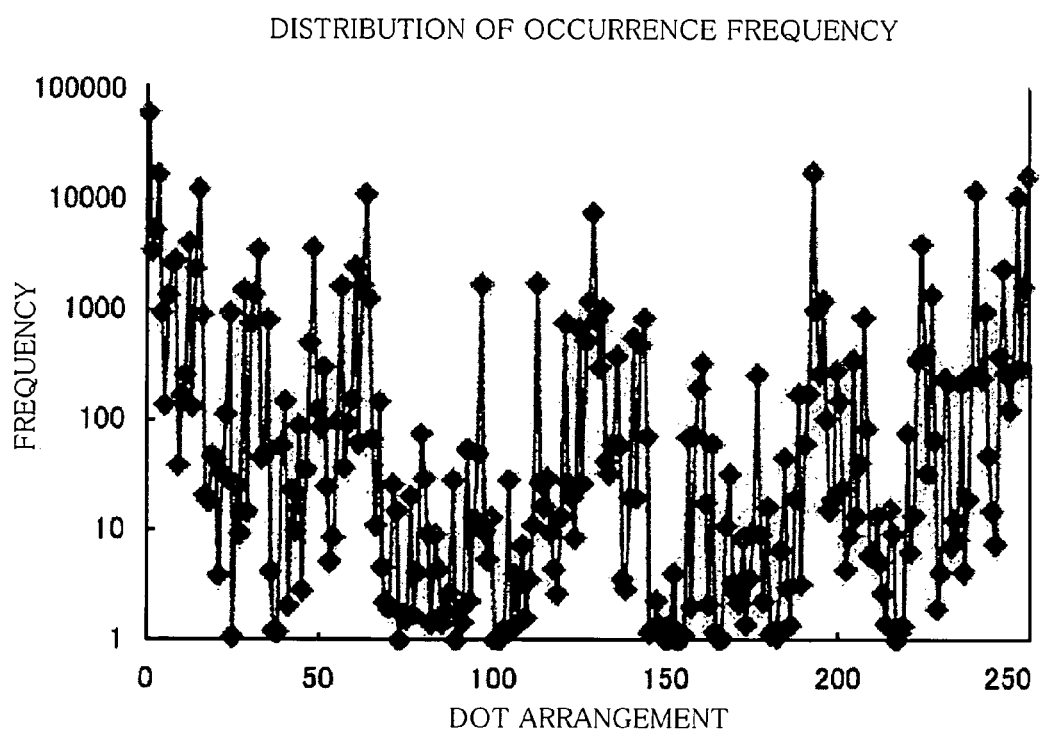
FIG. 15 is a graph showing a distribution of occurrence frequency of each dot pattern.

FIG. 12 shows a low resolution area TL and a medium resolution area TM, FIG. 13 is a graph showing a distribution of occurrence frequency of the differential of the number of dots in an image, FIG. 14 shows digitization of a dot pattern, and FIG. 15 is a graph showing a distribution of occurrence frequency of each dot pattern.

The medium resolution area dividing portion 104 further divides the low resolution area TL into four medium resolution areas TM each of which includes 3×8 pixels as shown in FIG. 12.

The medium resolution comparing portion 105 determines whether or not each dot pattern matches at least a part of the dither pattern DP in each medium resolution area TM in the same manner as the case of the low resolution area TL. Namely, as the medium resolution area TM includes three high resolution areas TS each of which has 8 pixels, it can be determined whether or not it matches the dither pattern DP by reading out the minimum value J and the maximum value K three times from the above-described upper and lower limit table TJK and by summing them up. Note that the determination whether or not it matches the dither pattern DP is performed in the medium resolution area TM because matching frequency increases if the area decreases.

The medium resolution representative value calculating portion 106 determines a representative value that is the number of dots beaten in the medium resolution area TM, e.g., the number of black dots if the medium resolution area TM matches the dither pattern DP. The medium resolution area TM includes total of 24 dots, so quantity of information is not so large even if the number of dots is adopted as the representative value, and a process for counting the number of dots is performed fast. It is possible to expand the number of dots to reproduce the original dot pattern. Then, in accordance with the obtained representative value, the differential of the representative value between neighboring medium resolution areas TM is calculated in the same manner as the case of the low resolution area TL described above. The differential is a value within the range of 0-24 as the recurring integer described above is used.

As shown in FIG. 13, the occurrence frequency is high in the differential ranges of approximately "0"-"3" and "21"-"24". Such a distribution is substantially the same regardless of a type of the image and has a very large deviation. Therefore, by using the differential, a high compression ratio can be obtained. For example, approximately ten times of the data compression ratio can be obtained.

Note that the representative value may be obtained in the medium resolution areas by the same method as in the resolution areas.

Note that an occurrence frequency about the value "25" is shown after 0-24 that are the differentials in FIG. 13. The reason is the same as the attribution code in the case of the low resolution area TL. The value "25" indicates the attribution code that indicates that a certain medium resolution area TM did not match any of the dither patterns DP.

Note that when a process of the four medium resolution areas TM for one low resolution area TL is finished, the process for the low resolution area TL is performed again.

The dot pattern extracting portion 107 divides the medium resolution area TM further into three high resolution areas TS having 8 pixels so as to digitize the dot pattern in this high resolution area TS when there was no matching in the medium resolution area TM, too. When digitizing the dot pattern, as shown in FIG. 14 for example, a pixel with a beaten dot is indicated by "1", while a pixel without a beaten dot is indicated by "0" as a binary number, which is converted into a decimal number to be output as the attribution code.

As shown in FIG. 15, it is understood that it is a distribution that is substantially deviated and is concentrated in a specific value. Therefore, in this case too, high compression ratio of data can be obtained by coding with the Huffman method. For example, approximately twice of compression ratio can be obtained.

Note that when the process for three high resolution areas TS for one medium resolution area TM is finished, the process for the medium resolution area TM is performed again.

The coding portion 108 encodes the entered data, i.e., a differential of the representative value "a", a differential of the number of dots and an attribution code by the Huffman method. The compression process in accordance with the Huffman method is very effective to an object in which frequency distribution of a signal is not changed largely. As the Huffman method itself is known, detailed description thereof is omitted.

[Description of Huffman Code Table]

In this embodiment, a differential and an attribution code of the representative value "a" in the low resolution area TL, a differential and an attribution code of the number of dots in the medium resolution area TM, and an attribution code in the high resolution area TS are coded with individual codes 1-3. For this purpose, three special-purpose Huffman code tables FH1-FH3 are provided to them, respectively.

FIGS. 16(a)-16(c) show examples of a Huffman code tables FH1-FH3. FIG. 16(a) shows a Huffman code table FH1 of a code 1 for low resolution areas, FIG. 16(b) shows a Huffman code table FH2 of a code 2 for medium resolution areas, and FIG. 16(c) shows a Huffman code table FH3 of a code 3 for high resolution areas. These Huffman code tables will be described briefly.

As shown in FIG. 16(a), Huffman code table FH1 includes items including an input, an output code and the number of output digits. A relationship between the input and the output code is determined in advance in accordance with the occurrence frequency of each data by coding with the Huffman method. The output code is actually stored in a memory as data of four bytes, and a code that is substantially less than four bytes has upper digits filled with "0".

Data of the output code corresponding to the input that is identical to the entered data are read out for plural digits indicated in the number of output digits from the least significant digit. For example, if the input is "3", "1000100" that is seven digits of the output code ". . . 0001000100" is read out. The read data "1000100" become the compressed data D2.

Similarly, the Huffman code tables FH2 and FH3 shown in FIGS. 16(b) and 16(c) also have items of input, output code and the number of output digits. A relationship between the input and the output code of each of the three Huffman code tables FH1-FH3 is independent from others, and is determined by coding with the Huffman method in advance.

For example, if the input is "1" in the Huffman code table FH2, "1010" that is four digits of the output code ". . . 0001010" is read out. If the input is "1" in the Huffman code table FH3, "1010" that is four digits of the output code " . . . 0001010" is read out.

Note that although the Huffman code tables FH1-FH3 may convert the data into the same code, it is possible to recognize which code 1-3 is used for the conversion, i.e., for which resolution area among the high, the middle and the low resolution areas the conversion was performed. Therefore, a decoding table DC corresponding to it can be selected so that a complete restoration or decoding can be performed.

For example, coding by code 1 using the Huffman code table FH1 for the low resolution area is performed until "256" appears in the data. When "256" appears, "256" is coded by code 1, and the Huffman code table is switched to FH2 for the medium resolution area, and coding by code 2 continues until the coding of four medium resolution areas TM is completed. If "25" appears during coding by code 2, "25" is coded by code 2, and then the Huffman code table is switched to FH3 for the high resolution area, and the coding by code 3 continues until the coding of three high resolution areas TS is completed. When the coding of three high resolution areas TS is completed, coding by code 2 is performed again. When coding of four medium resolution areas TM is completed, coding by code 1 is performed again. In accordance with this rule, entered data are coded sequentially, and the compressed data D2 are produced.

In addition, the compressed data generating portion 100 generates the decoding tables DC1-DC3 for expanding the compressed data D2 that was coded with the Huffman code tables FH1-FH3.

The data transmitting portion 109 sends the compressed data D2 generated by the coding portion 108 to the printer 13. In addition, the data transmitting portion 109 sends all the dither patterns DP and the decoding tables DC to the printer 13 in advance.

Note that the decoding table DC is generated in accordance with the occurrence frequency of the data. The occurrence frequency of the data can be also determined by actually performing the algorism in this embodiment. For example, as such a frequency table, a table can be used that is generated by summing up frequencies determined for each dither pattern DP for a character area, an image area or a chart area for each color C, M, Y or K. The frequency table is ideally determined for every image to be compressed, but without doing that, a frequency table generated by summing up as described above is capable of obtaining sufficient compression performance. For the similar reason, the same frequency table generated as described above can be used for each area such as a character area, an image area or a chart area for each color of C, M, Y or K.

[Expansion Process]

Next, the expansion process in the printer 13 will be described.

As shown in FIG. 4, the printer 13 includes a dither pattern memory portion 360, a data expansion portion 300, a decoding table memory portion 370 and a line buffer 380.

The dither pattern memory portion 360 stores a dither pattern that is identical to the dither pattern DP that is stored in the dither pattern memory portion 160 of the computer main body 11. This dither pattern DP is received from the computer main body 11 in advance, the same dither pattern may be stored in an appropriate memory, which is embedded in the printer 13 in advance.

The decoding table memory portion 360 stores the decoding table DC that is received from the computer 11.

The data expansion portion 300 refers the predetermined dither pattern DP and the decoding table DC so as to expand the compressed data D2 that are received from the computer 11 for reproducing the dot pattern. When expanding the compressed data D2, the expansion process by the decode 1 is performed first using the decoding table DC1 for the low resolution area. In accordance with a condition, the expansion process by the decode 2 using the decoding table DC2 for the medium resolution area, or the expansion process by decode 3 using the decoding table DC3 for the high resolution area is performed. Namely, the compressed data D2 coded by code 1, 2 or 3 is expanded by decode 1, 2 or 3, respectively.

FIG. 17 shows an example of a decoding table DC2.

As shown in FIG. 17, the decoding table DC2 includes items such as a code number, a Root, a child 0 or a child 1. An original data can be obtained by tracing the table from the position of Root=24 in accordance with the entered data. For example, if the entered data is "011011", the child 0 in Root=24 is the start point as the head of the data is "0". As the value of the child 0 in Root=24 is "23" and the next value of the data is "1", the child 1 in Root=23 is referred the next. As the value of the child 1 in Root=23 is "22" and the next value of the data is "1", the child 1 in Root=22 is referred the next. Similar process is repeated, and it is finished when the value of the child 0 or the child 1 becomes a negative value. A total sum of the last obtained value (a negative value) and the code number ("26" in this case) is the original data. Then, the same process is performed from the next value of the data and is repeated until expansion of the data is completed.

When reproducing a dot pattern, the expansion process is performed by decode 1 first. If the value that is expanded by the decoding table DC1 is "258", it indicates that the dither pattern DP is switched. If plural values of "258" are repeated, the dither pattern DP is switched plural times corresponding to the number of repeated times in order, and the dither pattern DP after switching is set as the dither pattern (the current dither pattern) DP that is used afterward.

If the expanded value is "256", the subsequent process is switched to the expansion process by decode 2 using the decoding table DC2 for the medium resolution area. If the expanded value is "257", it indicates that "0" is repeated 50 times as the differential of the representative value. Therefore, the dot pattern is reproduced by the same value as the representative value of the low resolution area TL that was calculated the last time for 50 areas with the current dither pattern DP, and the reproduced dot pattern is sent to the line buffer 380. If the end of line appears before completing the process for 50 areas, the remained data are sent as data for the next line to the line buffer 380. If the expanded value is not any of them, the value is the differential of the representative value. In this case, the representative value "a" of the low resolution area TL that was calculated the last time is regarded as an initial value, and the differential is added to the initial value so as to obtain the representative value "a" this time. In this way, by accumulating the differentials, the representative values "a" of all the low resolution areas TL can be obtained. If this time is an initial time, the initial value is set to "0" for obtaining the representative value "a". Then, the dot pattern is reproduced from the obtained representative value "a" and the current dither pattern DP, and the reproduced dot pattern is sent to the line buffer 380.

In the expansion process by decode 2, expansion is performed with the decoding table DC2 for the medium resolution area. If the value expanded by decode 2 is "25", the subsequent process is switched to the expansion process by decode 3 for the high resolution area. If the expanded value is not "25", the value is the differential of the representative value (the number of dots) between the medium resolution areas TM. In this case, the representative value is determined by accumulation similar to the case of the low resolution area. A dot pattern in the medium resolution area TM is reproduced from the obtained representative value and the current dither pattern DP. When the process for four medium resolution areas TM is completed, the expansion process by decode 1 is performed again.

In the expansion process by decode 3, the data are expanded with the decoding table DC3 for the high resolution area. The result of the expansion by decode 3 indicates a dot arrangement of eight pixels. The expansion process is repeated for three high resolution areas TS, thereby a dot pattern of one medium resolution area TM is reproduced. Thus, it is counted that the expansion process for one medium resolution area TM is completed, and the expansion process by decode 2, which called the expansion process by decode 3, is performed again.

In this way, the attribution codes "256" and "25" work as code switching signals between areas, and switching from code 1 to code 2, or code 2 to code 3 is secured when these attribution code appear.

The line buffer 380 stores the binarized image data received from the data expansion portion 300 temporarily. The binarized image data stored in the line buffer 380 are output for every six lines, for example, and they are printed out on a sheet of paper.

[Description with Reference to Flowcharts]

Next, the processes in the computer main body 11 and the printer 13 are described with reference to flowcharts.

Figure 18:
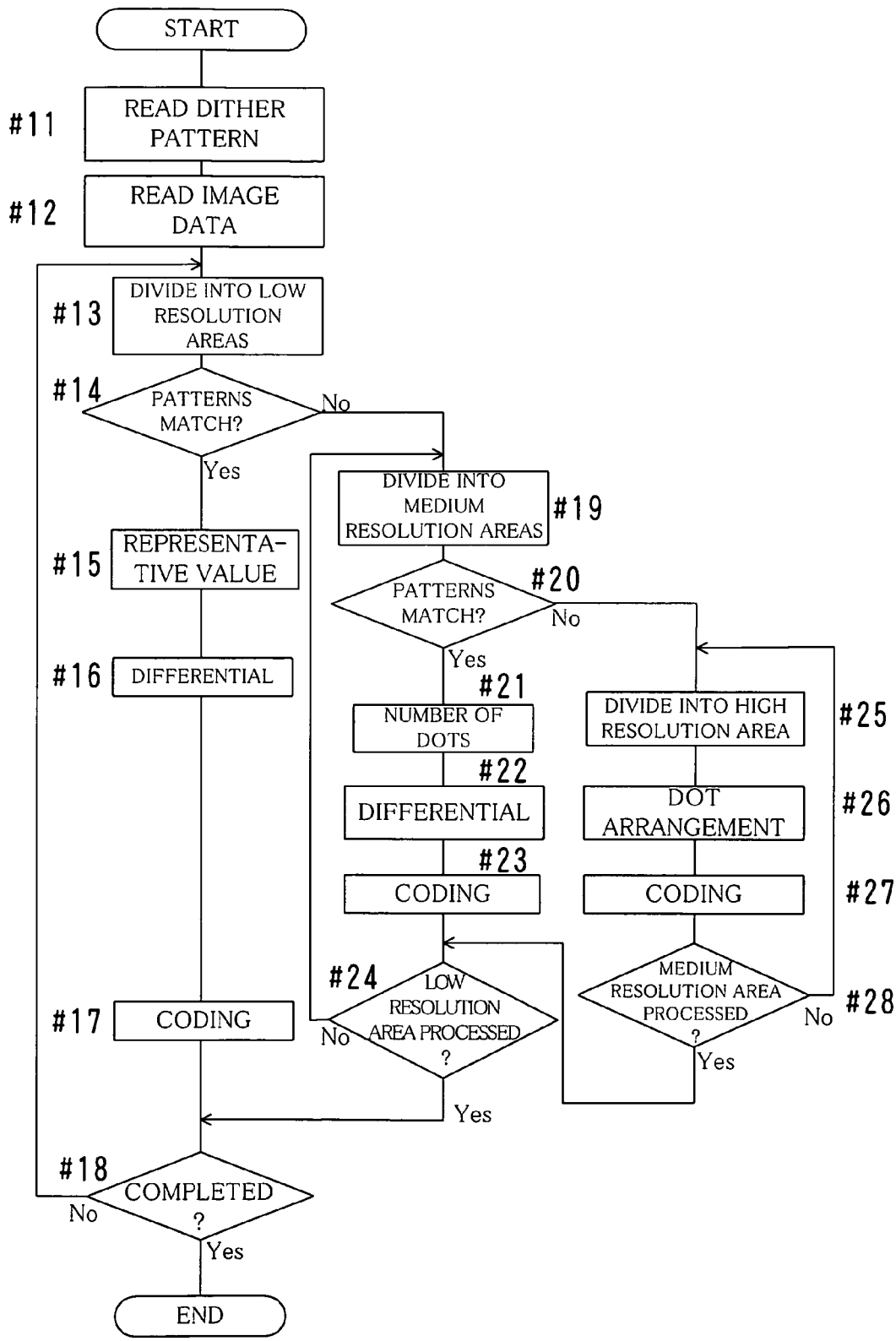
FIG. 18 is a flowchart showing a general flow of a compression process.
Figure 19:
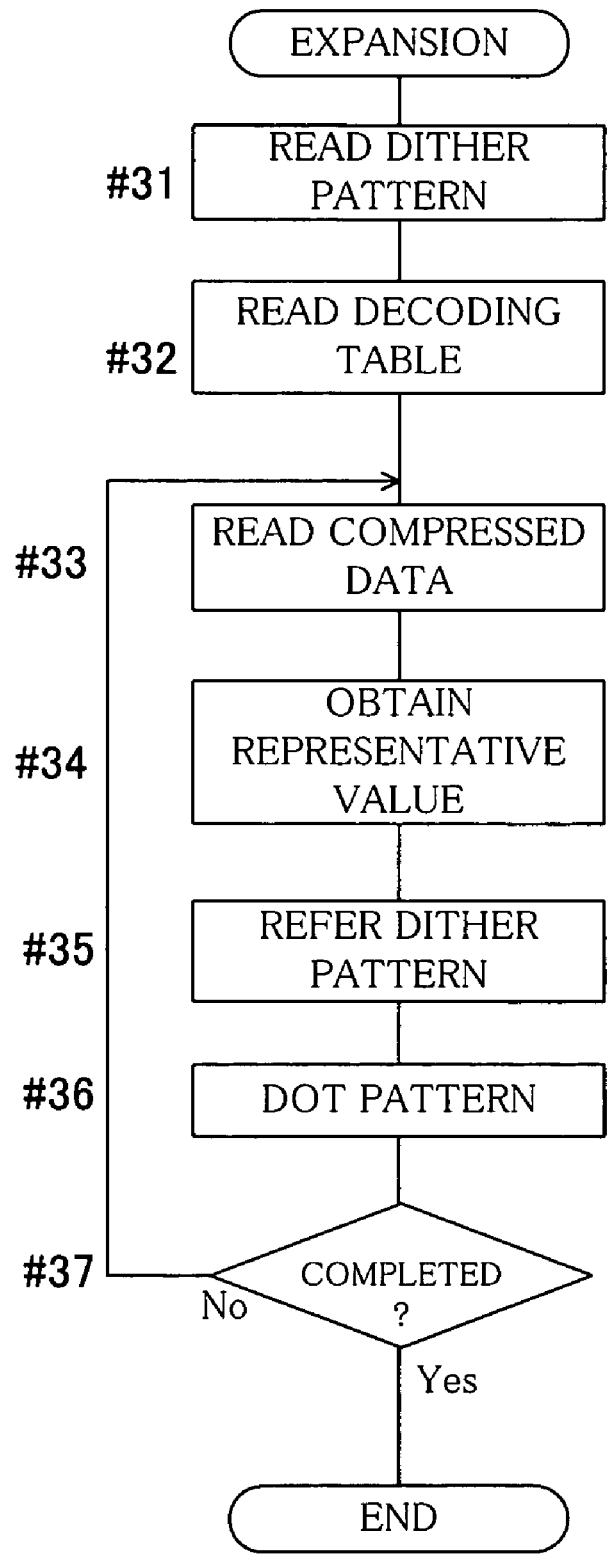
FIG. 19 is a flowchart showing a general flow of an expansion process.

FIG. 18 is a flowchart showing a general flow of the compression process by the computer main body 11, and FIG. 19 is a flowchart showing a general flow of an expansion process by the printer 13.

As shown in FIG. 18, the dither pattern DP is read as preparation (#11), and then the binarized image data D1 is read (#12). The binarized image data D1 are divided into low resolution areas TL (#13), and it is determined whether or not one of the low resolution areas TL matches the dither pattern DP (#14). If there are plural dither patterns DP, the dither pattern DP is switched until they match one another. When they match one another (Yes in #14), the representative value "a" is determined (#15), and a differential thereof is calculated (#16), and it is coded (#17).

If the patterns do not match one another in Step #14, it is divided into the medium resolution areas TM (#19), and it is determined whether or not one of the medium resolution areas TM matches the dither pattern DP (#20). If they match one another, the number of dots is determined (#21), a differential thereof is calculated (#22), and it is coded (#23). If the patterns do not match one another in Step #20, it is divided into the high resolution area TS (#25), and a dot arrangement is obtained for one of the high resolution areas TS (#26), and it is coded (#27).

This process is performed until it is completed for all the read binarized image data D1 (#18, #24 and #28).

As shown in FIG. 19, the dither pattern DP and the decoding table DC are read as preparation (#31 and #32). The compressed data D2 are read (#33), so as to obtain the representative value "a" (#34), and the dither pattern DP is referred so that a dot pattern is obtained (#35 and #36). Note that description of the expansion process for the medium resolution area TM and the high resolution area TS is omitted.

Next, more detailed flowcharts will be used for description.

Figure 20:
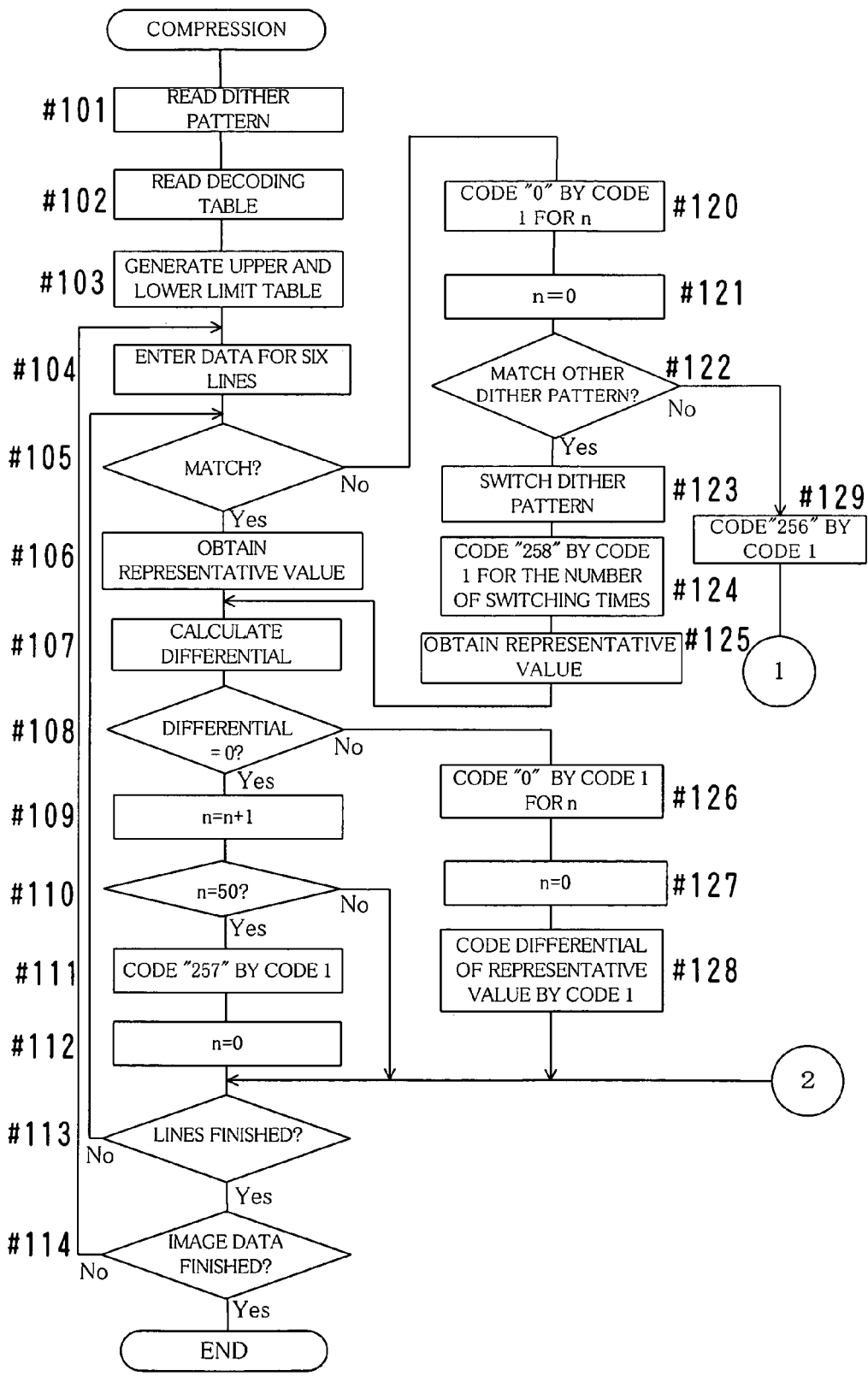
FIGS. 20 and 21 are flowcharts of a compression process in the compressed data generating portion.
Figure 21:
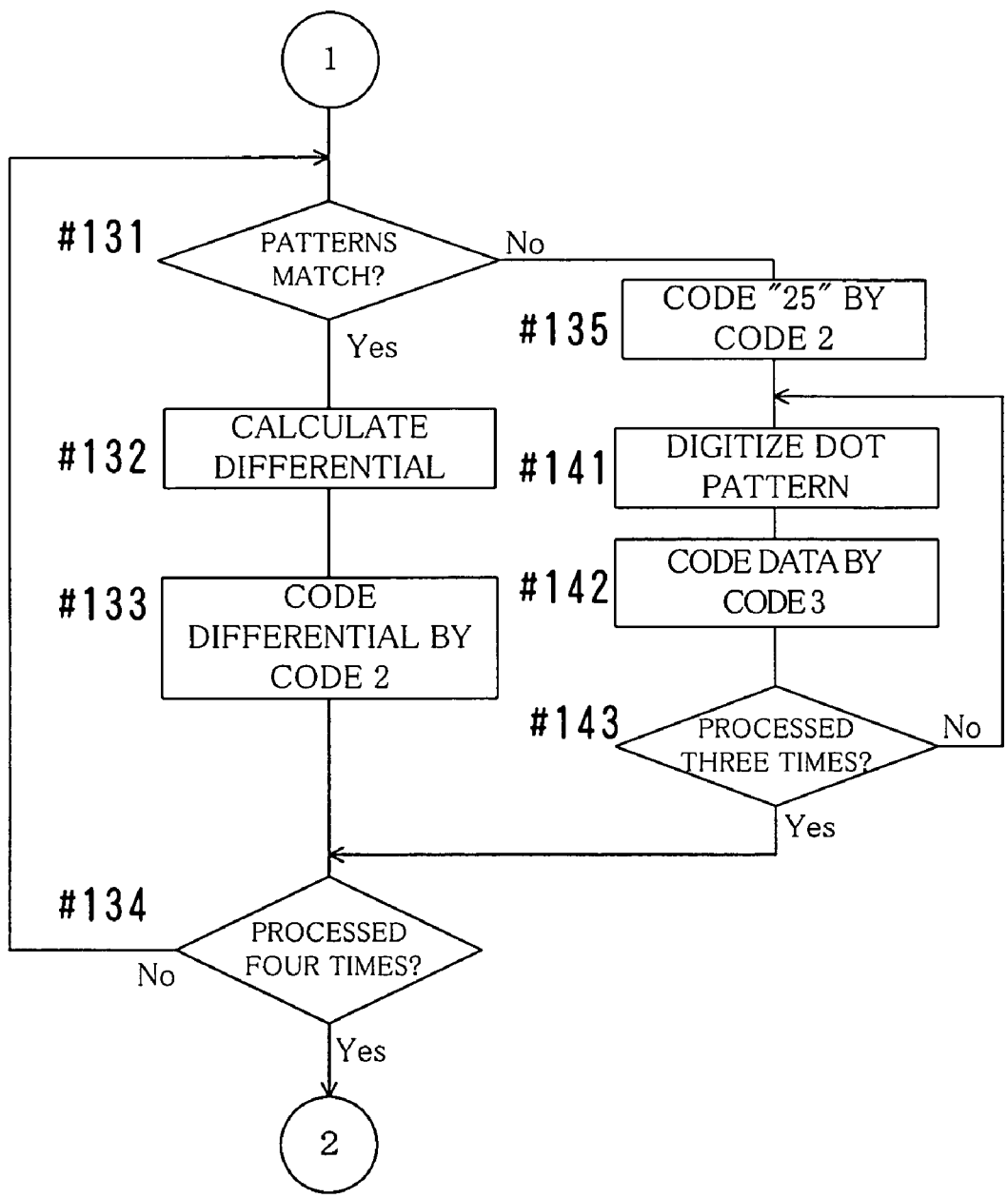
Figure 22:
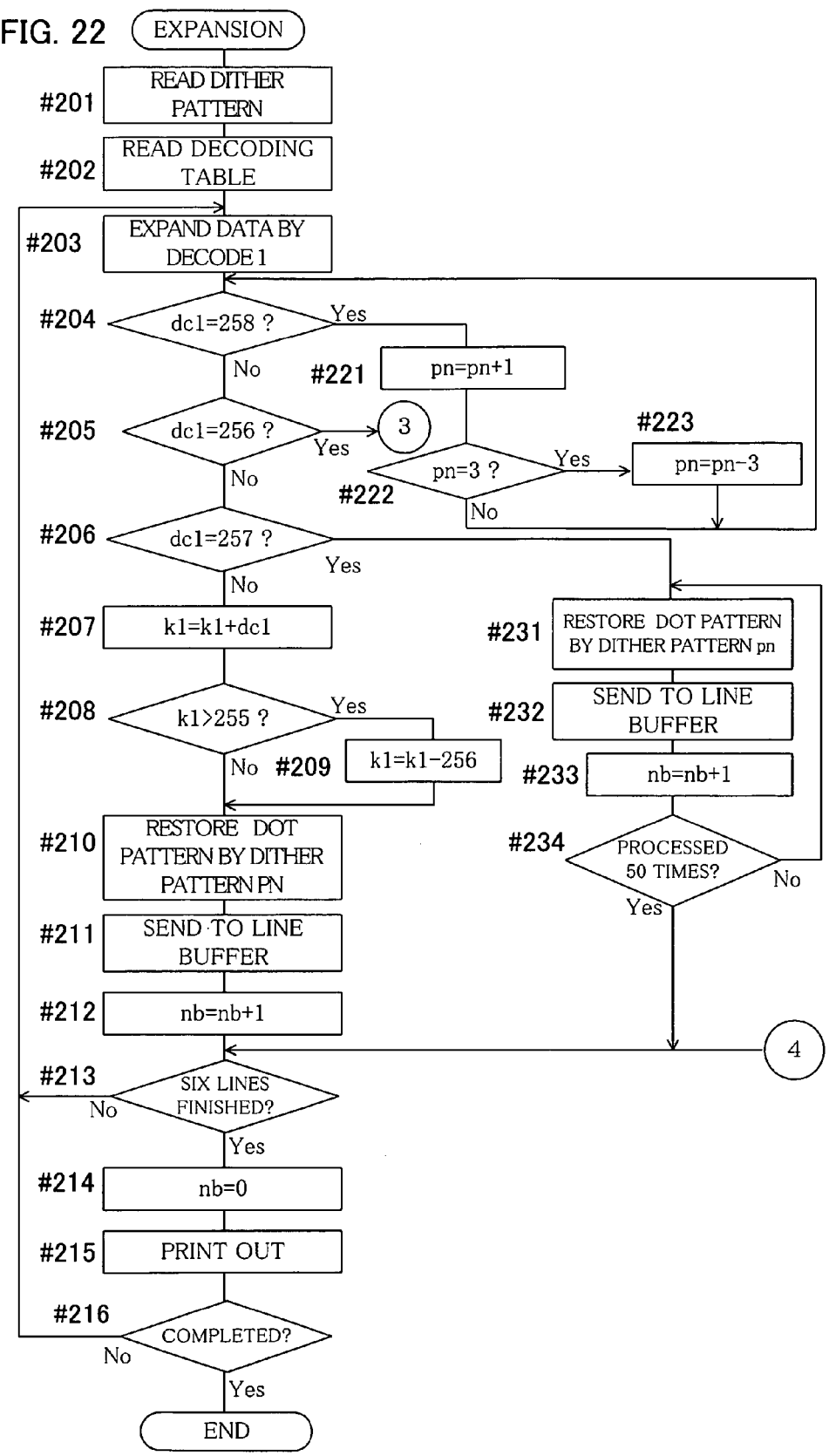
FIGS. 22 and 23 are flowcharts of an expansion process in a data expansion portion.
Figure 23:
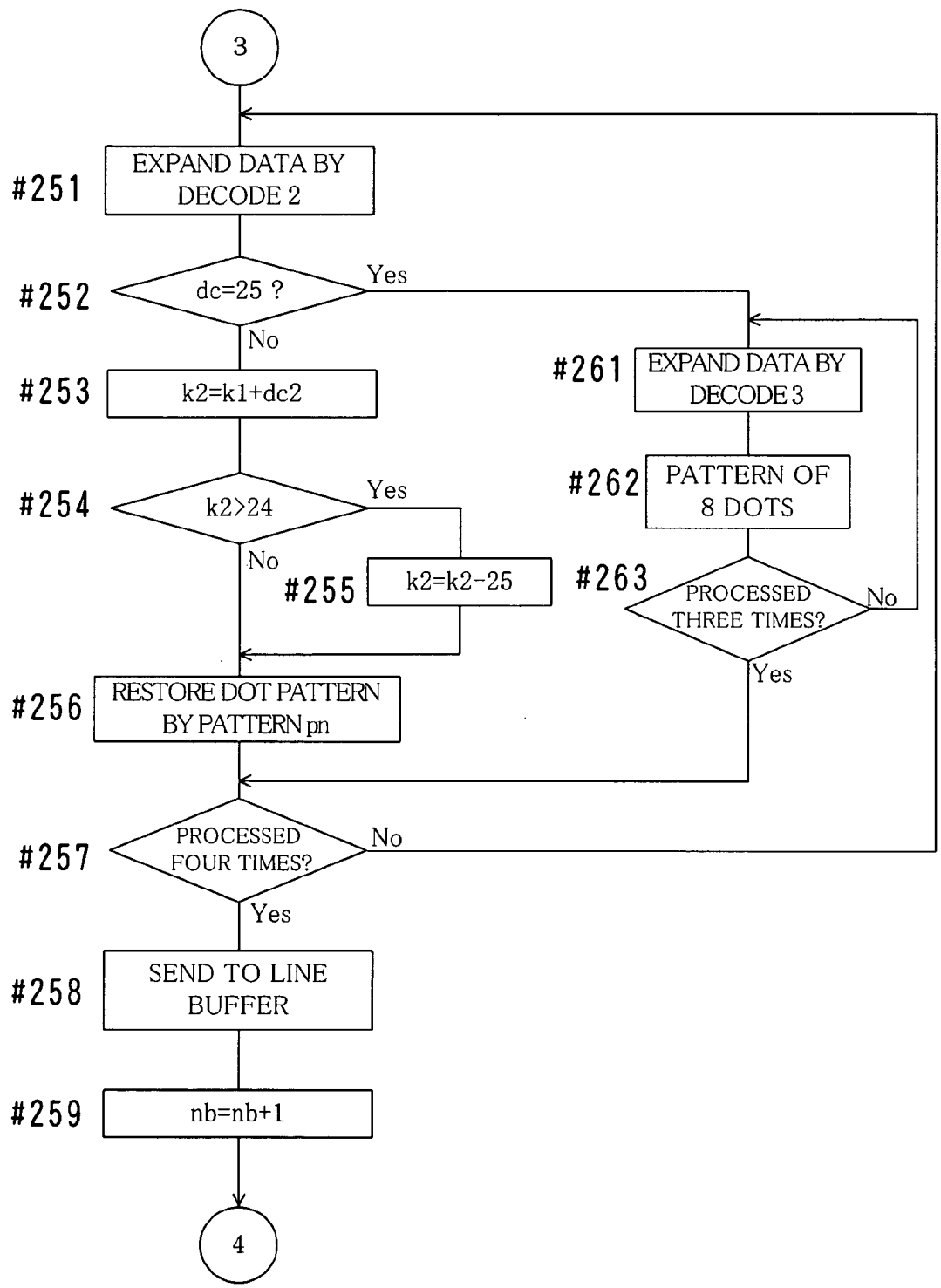
Figure 24:
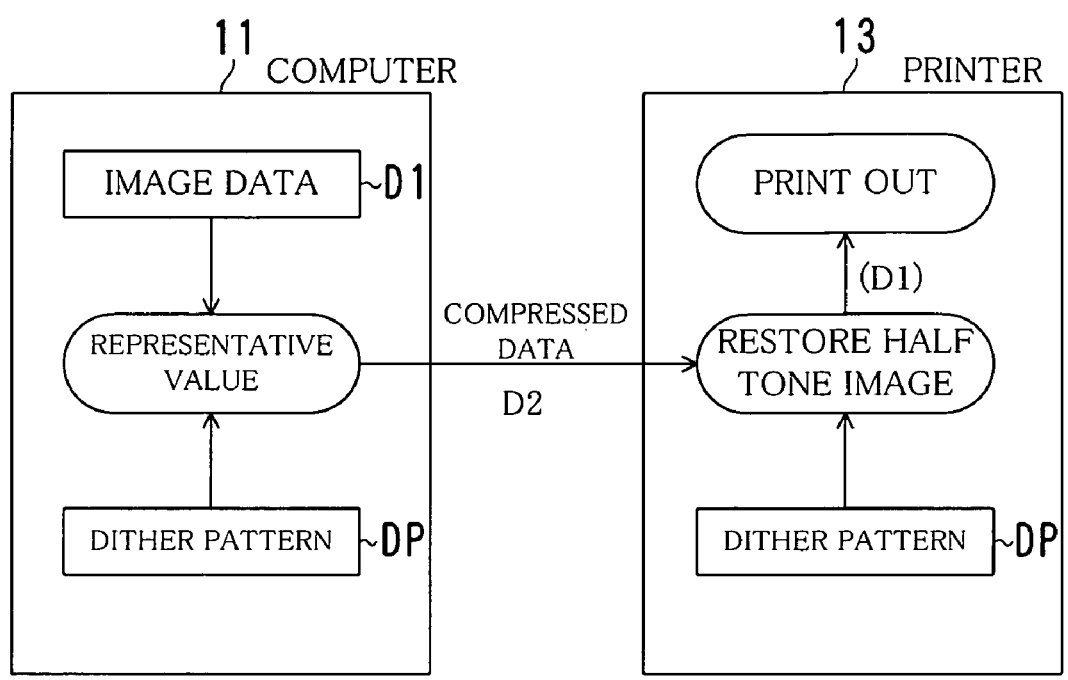
FIG. 24 shows a general process of the print system according to the present invention.

FIGS. 20 and 21 are flowcharts of a compression process in the compressed data generating portion 100, and FIGS. 22 and 23 are flowcharts of an expansion process in a data expansion portion 300. Note that these flowcharts show the process for one color component among C, M, Y and K colors.

As shown in FIGS. 20 and 21, the dither pattern DP and the decoding table DC are read first (#101 and #102). In addition, the dither pattern DP and the decoding table DC are sent to the printer 13 in advance. The upper and lower limit table TJK is generated (#103). Data for six lines in the binarized image data D1 are entered (#104), and it is determined from the left end whether or not one of the low resolution areas TL matches the dither pattern DP (#105). If they match one another, the upper and lower limit table TJK is referred for obtaining the representative value "a" (#106), and a differential of the representative value is calculated (#107).

If the differential of the representative value is "0" (Yes in #108), the variable n that indicates the number of repeated times is incremented (#109). When the variable n becomes "50" (Yes in #110), the attribution code "257", which indicates that the representative value differential "0" is repeated 50 times, is coded by code 1 to be the compressed data D2 for output (#111). Then, the variable n is initialized to "0" (#112).

In the case of No in Step #105, i.e., if it does not match the dither pattern DP, the representative value differential "0" is coded by code 1 for the number of times before the present time for output (#120), and the variable n is initialized to "0" (#121). Then, it is checked whether or not it matches other dither pattern DP (#122). If there is matching other dither pattern DP (Yes in #122), the dither pattern DP is switched for use (#123), the attribution code "258" indicating that the dither pattern DP is switched is coded by code 1 for the number of switching times and is output (#124). Then, the representative value "a" is obtained (#125), and the process goes to Step #107.

In the case of No in Step #108, i.e., if the representative value differential is not "0" (No in #108), the representative value differential "0" is coded by code 1 for the number of times before and is output (#126). Then, the variable n is initialized to "0" (#127). Then, the differential of the representative value is coded by code 1 and is output (#128), and the process goes back to Step #113.

If the process is not finished to the right end of the entered six lines (No in #113), the process after Step #105 is repeated for performing the process for the low resolution area TL neighboring at the right side sequentially for the same six lines. If there is a line that is not processed (No in #114) when the process for six lines is finished (Yes in #113), next six lines of the binarized image data D1 are entered (#104) and this process is repeated until all the process for the binarized image data D1 is finished (#114).

In the case of No in Step #122, i.e., if there is not matching dither pattern DP, the attribution code "256" indicating that the low resolution area TL did not match any dither pattern DP is coded by code 1 and is output (#129). Then, the process goes to Step #131 and the subsequent steps that is a process for the medium resolution area TM.

In the process for the medium resolution area TM, it is determined whether or not one of the medium resolution areas TM, which are obtained by dividing the low resolution area TL into four, matches one of dither patterns DP (#131). If they match one another (Yes in #131), the number of dots in the medium resolution area TM is obtained so as to calculate the differential (#132), and the number of dots differential is coded by code 2 and is output (#133). This process is repeated four times, and then the process goes back to Step #113 that is the process for the low resolution area TL.

In the case of No in Step #131, i.e., if the medium resolution area TM did not match any dither pattern DP, the attribution code "25" indicating they did not match is coded by code 2 and is output (#135). Then, the process goes to Step #141 and subsequent steps that is a process for the high resolution area TS.

In the process for the high resolution area TS, a dot pattern of one of the high resolution areas TS, which are obtained by dividing the medium resolution area TM into three, is digitized (#141), and the value is coded by code 3 and is output (#142). This process is repeated three times (#143), and the process goes back to Step #134 that is a process for the medium resolution area TM.

In FIGS. 22 and 23, the dither pattern DP and the decoding table DC are read first (#201 and #202). Then, the compressed data D2 are received from the computer main body 11, and the expansion process is performed from the head of the data in turn. First, the data are expanded by decode 1 (#203).

If the value dc1 obtained by the expansion process is not any of the attribution codes "258", "256" and "257" (No in #204-#206), the value dc1 is a differential of the representative values "a". Therefore, the value dc1 is added to the accumulated value k1 up to then, and the obtained value is set as a new accumulated value k1 (#206). If the accumulated value k1 exceeds "255" (Yes in #208), it exceeds the maximum value of the representative value "a". Therefore, "256" is subtracted from the accumulated value k1 (#209). Then, the accumulated value k1 is set as the representative value "a" so as to restore a dot pattern by using the dither pattern DP that is specified by a pattern number pn (#210). The dot pattern is sent to the line buffer (#211), and the area number nb is incremented (#212). Note that the area number nb is a number that indicates a position in six lines of the low resolution area TL to be processed.

The process of Step #203 and the subsequent steps is repeated until the expansion for the same six lines is finished (No in #213). When the expansion for the six lines is finished (Yes in #213), the area number nb is initialized to "0" (#214), and the expanded data of six lines (binarized image data) are printed out (#215). The process is repeated until the process is finished for all the compressed data D2 (#216).

In the case of Yes in Step #204, i.e., if the value dc1 obtained by the expansion is "258", the pattern number pn is incremented (#221). If the pattern number pn is "3" (Yes in #222), "3" is subtracted from the pattern number pn. Namely, a value of the pattern number pn can be one of "0", "1" and "2", so that three types of the dither patterns DP can be specified.

In the case of Yes in Step #206, i.e., if the value dc1 is "257", the accumulated value k1 is set as the representative value "a", and a dot pattern is restored by using the dither pattern DP that is specified by the pattern number pn (#231). The dot pattern is transmitted to the line buffer (#232), and the area number nb is incremented (#233). This process is repeated 50 times (#234). Thus, the binarized image data in the 50 low resolution areas TL can be reproduced in accordance with the representative value "a" when the differential value "0" is repeated 50 times. Note that if the right end of the line appears during this process, the process is stopped once so as to perform the process of Step #214 and the subsequent steps. The dot pattern is written from the head of the next line.

In the case of Yes in Step #205, i.e., if the value dc1 is "256", the process goes to Step #251 that is a process for the medium resolution area TM. In Step #251, the data are expanded by decode 2. If the value dc2 obtained by decode 2 is not "25" (No in #252), the value dc2 is a differential of the number of dots. Therefore, the value dc2 is added to an accumulated value k2 up to then, and the obtained value is set as a new accumulated value k2 (#253). If the accumulated value k2 exceeds "24" (Yes in #254), it exceeds the maximum value of the number of dots. Therefore, "25" is subtracted from the accumulated value k2 (#255). Then, the accumulated value k2 is set as the number of dots, and the dot pattern is reproduced by using the dither pattern DP that is specified by the pattern number pn (#256). This process is repeated four times (#257). The dot patterns of four times are transmitted to the line buffer (#258), and the area number nb is incremented (#259).

In the case of Yes in Step #252, i.e., if the value dc2 is "25", the process goes to Step #261 that is a process for the high resolution area TS. In Step #261, data are expanded by decode 3 (#261). The pattern of eight dots in the high resolution area TS is reproduced from the expanded value (#262). This process is repeated three times (#263).

As described above, the binarized image data D1 are divided into a dither pattern information component and an image information component when performing the compression process. Then, only the image information component is extracted and coded by the Huffman method to be the compressed data D2. As the compressed data D2 do not include the dither pattern information component, both a high compression ratio and a high speed process can be realized.

In addition, the process for calculating the representative value "a" is performed at a high speed by read data from the upper and lower limit table TJK, so that the total process time can be shortened largely. In addition, image data of eight pixels are replaced with one value in the process for the high resolution area TS, so the addressing can be performed at a high speed. Thus, the total process time can be shortened.

In printer 13, a cost of an ASIC that is used for expanding compressed data D2 depends on a size of a working area of an on-chip memory largely. The working area necessary for expansion process of data includes an area for storing a read dither pattern DP and decoding table DC as well as an area for storing data of the area to be processed. The necessary data quantity is, for example, approximately a few hundreds to a few kilobytes for the dither pattern DP and approximately two kilobytes for the decoding table DC. Including other buffers, total 3-4 kilobytes of memory capacity is sufficient. Therefore, a small scaled ASIC having 3-4 kilobytes of memory may be equipped in the printer 13 so that expansion process of the compressed data D2 can be performed at a high speed. In addition, the memory capacity of the working area can be reduced more by storing the decoding table DC in ROM. In this way, a small scale of hardware is sufficient in the printer 13 for expanding the compressed data D2 at a high speed. Thus, inexpensive printer 13 can be used while performing the entire process in short time.

In the embodiment described above, the low resolution area dividing portion 101 shown in FIG. 3 divides the binarized image data D1 into the low resolution area TL, but various methods for dividing can be adopted. Namely, the division can be imaginary, and it is not necessary to divide the binarized image data D1 into areas actually. For example, it is possible that the low resolution comparing portion 102 designates an address for pointing a position to be compared. The structure of the compressed data generating portion 100 shown in FIG. 3 is an example, and various structures can be adopted for realizing the function described above.

In the embodiment described above, the computer main body 11 is equipped with the pseudo gradation generating portion 170, where the binarization process of the image data is performed. However, it is possible that the binarization process is not performed inside the computer main body 11, and binarized image data D1 are entered externally instead. In this case, it is necessary to obtain information such as the dither pattern DP that was used for the binarization process. Although the binarization process is performed for pseudo gradation in the embodiment described above, multivalue such as three-value, four-value or sixteen-value may be adopted instead.

In the embodiment described above, each pixel with or without a beaten dot of the binarized image data D1 can be also expressed with or without a flag. It is possible to beat a dot at a pixel having a high density or a pixel having a low density. Concerning the minimum value J and the maximum value K of the density values of pixels for determining the representative value "a", it is possible to determine by supposing the case where a dot is beaten at a pixel having a low density, or by supposing the case where a dot is beaten at a pixel having a high density. In this way, various combinations can be adopted concerning gradation properties, density values, luminance values and relationship between them and with or without a beaten dot.

Furthermore, the structure of the entire or a part of the computer main body 11, the printer 13 and the print system 1, the function, the number, the number of bits, and contents or order of the processes can be modified if necessary in accordance with the spirit of the present invention.

The present invention can be used as a print system for printing out image data that have pseudo gradation using a raster printer or a GDI printer.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A print system including a computer and a printer, the print system being for printing image data having pseudo gradation generated by using a dither pattern by the printer, wherein
the computer divides the image data into predetermined areas, determines whether or not a dot arrangement pattern of image data in each of the areas matches a dot arrangement pattern that is obtained by a binarization process that uses imaginary uniform image data and the dither pattern, determines a representative value concerning a density of image data within the area if the dot arrangement pattern of the area matches the dot arrangement pattern for the imaginary uniform image data, and sends data related to the determined representative value to the printer, and
the printer obtains the representative value of each area from data that are received from the computer and compares the obtained representative value with the dither pattern so as to reproduce a dot pattern,
wherein the representative value is a value "a" that satisfies the condition $J \geq a \geq K$,
wherein a dot for a given pixel is formed if a density value of the given pixel is smaller than a density value of a pixel in a corresponding part of the dither pattern, "J" is a minimum value of upper limit density values of pixels of the dither pattern corresponding to the dots that were formed in the area and "K" is a maximum value of lower limit density values of pixels of the dither pattern corresponding to dots that were not formed in the area.

2. The print system according to claim 1, wherein the computer determines the representative value by comparing a density value of each pixel of image data within the area with a density value of each pixel of the dither pattern and by determining the number of beaten or unbeaten dots in the area when dots are beaten in a predetermined pattern area if a density value of each pixel of the image data is small.

3. The print system according to claim 1, wherein the computer determines a differential of representative value between each area and other area, and the determined differential is coded so as to produce the data to be sent to the printer.

4. The print system according to claim 1, wherein if the dot arrangement pattern of the image data in the area does not match the dither pattern that was used for generating the pseudo gradation, the computer further divides the area into plural small areas, determines whether or not a dot arrangement pattern of image data in each of the small areas matches the dither pattern, and determines the number of beaten or unbeaten dots in the area as a representative value in the small area when the patterns match one another.

5. The print system according to claim 4, wherein if the dot arrangement pattern of the image data in the area or in the small area does not match the dither pattern that was used for generating the pseudo gradation, the computer encodes an arrangement of beaten or unbeaten dots in the area or in the small area so as to produce the data to be sent to the printer.

6. The print system according to claim 1, wherein the dither pattern is provided to the computer and the printer, respectively.

7. A printer for printing an image by expanding compressed data that are received from a computer that produces the compressed data by dividing image data having pseudo gradation generated by using a dither pattern into predetermined areas and by determining a representative value concerning a density of image data within the area if a dot arrangement pattern of image data in each of the areas matches a dot arrangement pattern that is obtained by a binarization process that uses imaginary uniform image data and the dither pattern, wherein
    the printer stores a dither pattern that is the same as the dither pattern provided to the computer, and the printer reproduces the image data having pseudo gradation before compressed by comparing the representative value received from the computer with the dither pattern so as to generate a dot pattern and by expanding the generated dot pattern, wherein the representative value is a value "a" that satisfies the condition $J \geq a \geq K$, and wherein a dot for a given pixel is formed if a density value of the given pixel is smaller than a density value of a pixel in a corresponding part of the dither pattern, "J" is a minimum value of upper limit density values of pixels of the dither pattern corresponding to the dots that were formed in the area and "K" is a maximum value of lower limit density values of pixels of the dither pattern corresponding to dots that were not formed in the area.

8. The printer as shown in claim 7, wherein the dot pattern is received from the computer and is stored in the printer.

* * * * *